(12) United States Patent
Pal

(10) Patent No.: US 7,474,020 B2
(45) Date of Patent: Jan. 6, 2009

(54) RELAYING PISTON MULTIUSE VALVE-LESS ELECTROMAGNETICALLY CONTROLLED ENERGY CONVERSION DEVICES

(76) Inventor: Anadish Kumar Pal, 194 Vaishali, Pitampura, Delhi (IN) 110088

( * ) Notice: Subject to any disclaimer, the term of this patent is extended or adjusted under 35 U.S.C. 154(b) by 219 days.

(21) Appl. No.: 11/101,522

(22) Filed: Apr. 8, 2005

(65) Prior Publication Data
US 2006/0226728 A1    Oct. 12, 2006

(51) Int. Cl.
*H02K 35/02* (2006.01)
(52) U.S. Cl. .......................................... 310/17; 310/14
(58) Field of Classification Search ............... 310/14, 310/15, 17, 23, 24
See application file for complete search history.

(56) References Cited

U.S. PATENT DOCUMENTS 3,859,789 A * 1/1975 Fawcett et al. ............... 60/325
4,381,181 A * 4/1983 Clegg ....................... 417/423.7
5,347,186 A * 9/1994 Konotchick ................. 310/17
5,452,520 A * 9/1995 Raj et al. .................. 33/366.18

* cited by examiner

*Primary Examiner*—Dang D Le

(57) ABSTRACT

Energy conversion devices employing gases and/or liquids as medium, constructed with a hollow, preferably toroidal cylinder having two ports and two, or more, identical ferromagnetic pistons moveably sealing the hollow cylinder. Movements of the pistons are electromagnetically selectable from the outside of the cylinder to either impart varying unidirectional forces on the medium and/or to influence a magnetic circuit placed outside the cylinder for the generation of motive or electromotive forces. In a pump, a compressor and an externally heated engine, the selective movement of the pistons always maintains a piston between the two ports. In an internal-combustion engine, addition is made of more pistons and one piston is selectively stopped and approached by the adjacent piston, compressing a gaseous mixture to effect combustion; electronic detection of the combustion allows the rapid electromagnetic release of the stopped piston and stops the adjacent piston which was compressing prior to the combustion.

12 Claims, 8 Drawing Sheets

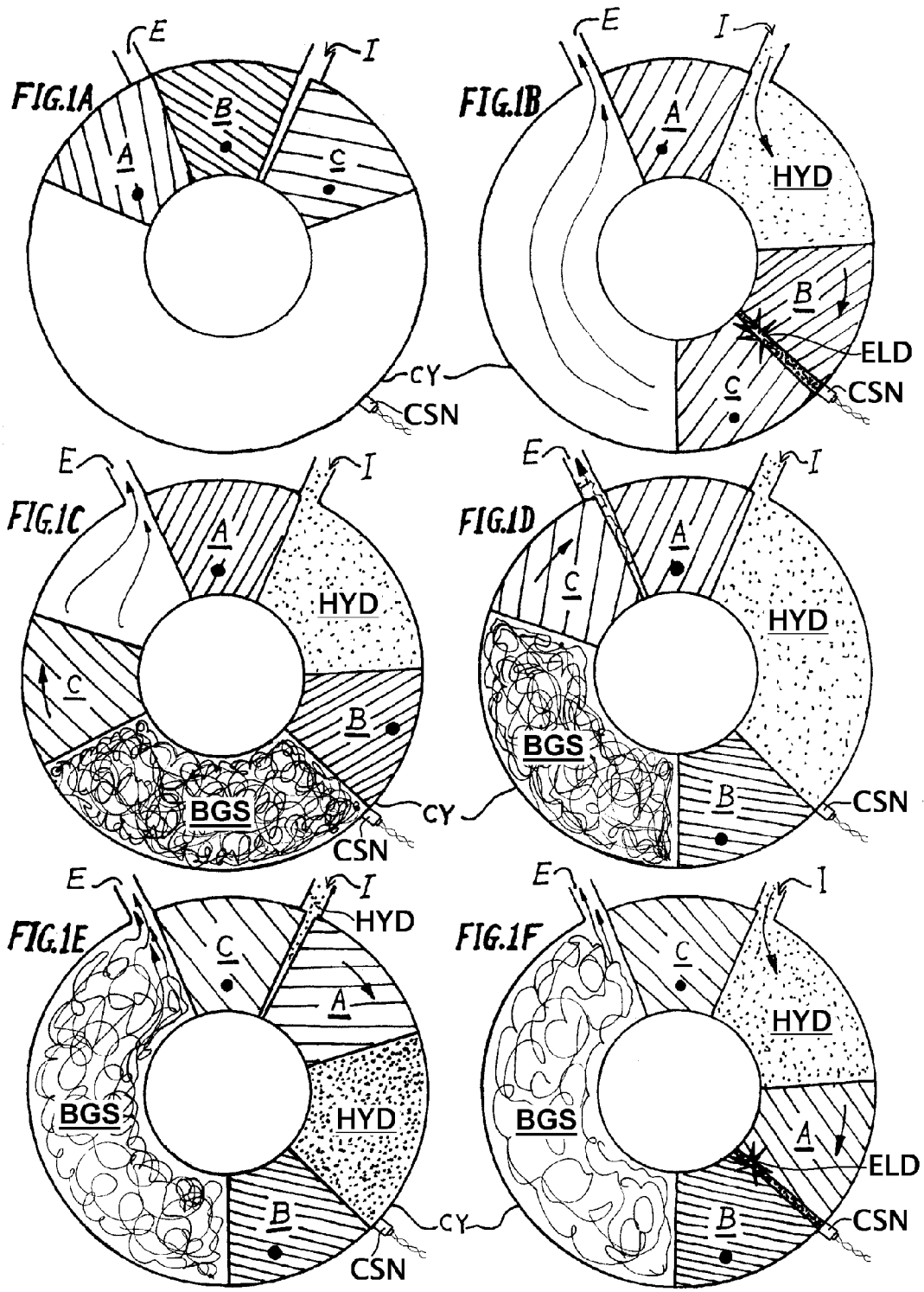

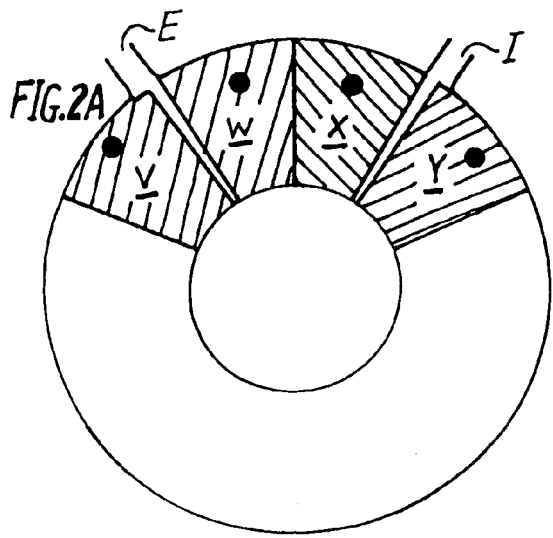
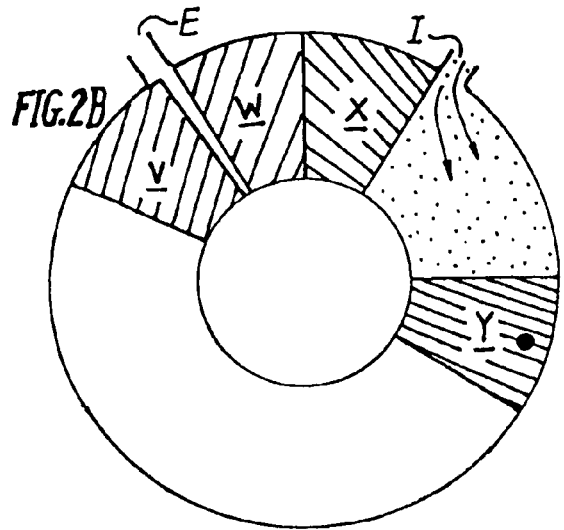
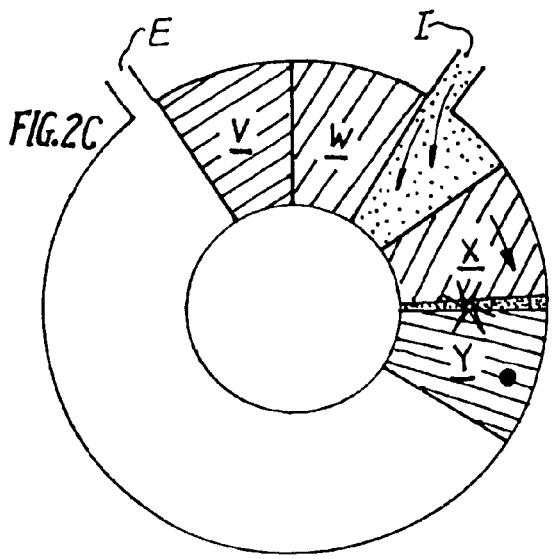
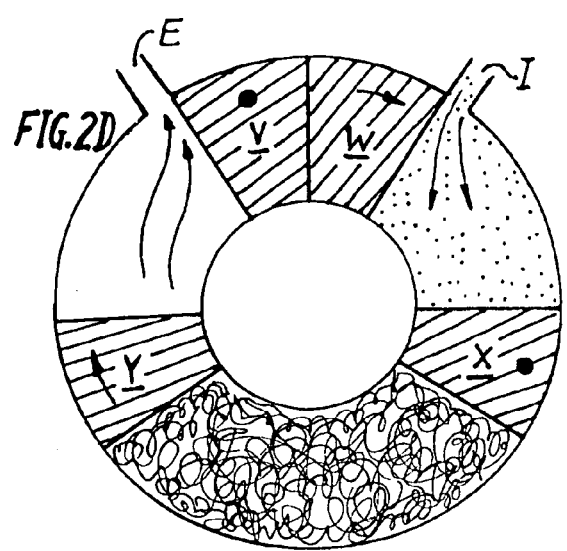
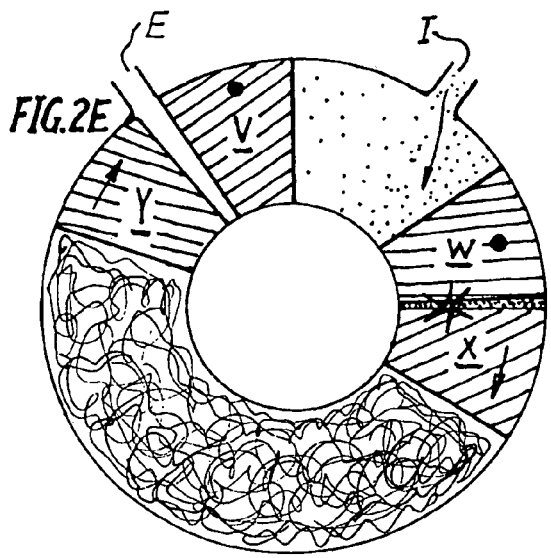
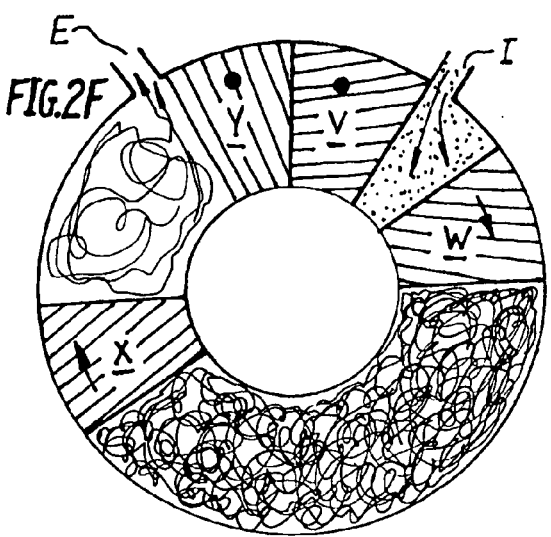

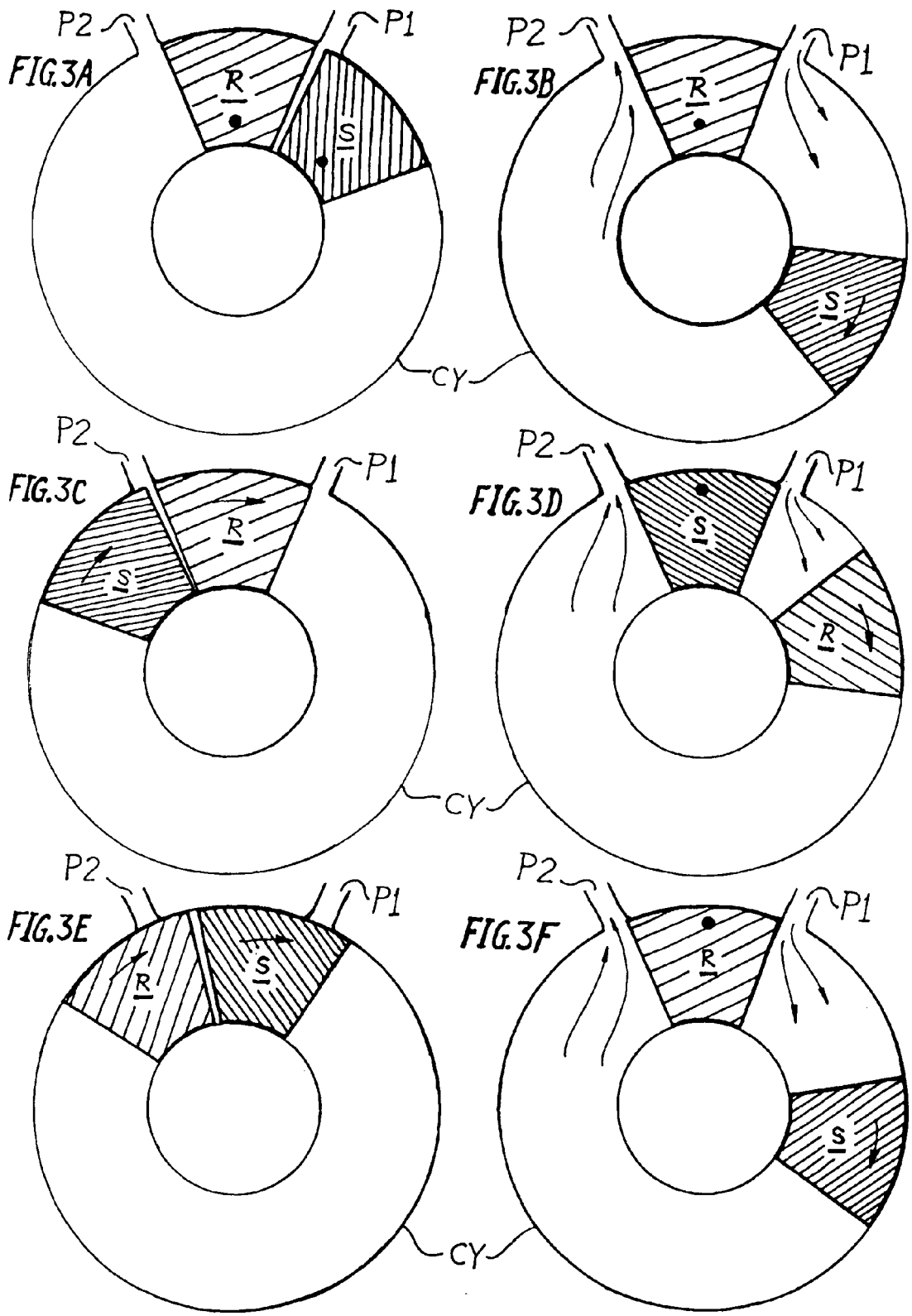

RELAYING PISTON MULTIUSE VALVE-LESS ELECTROMAGNETICALLY CONTROLLED ENERGY CONVERSION DEVICES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention in its various forms is directed to the field of pumps, engines and electrical generators. This invention can be implemented for making of various kinds of engines, namely, Stirling, external combustion, internal combustion, and free-piston engines. This invention can also be implemented in electrically driven pumps and compressors.

At present the most common engine is an internal-combustion engine. Research is being done in the field of free-piston engines (U.S. Pat. No. 6,199,519). Current free-piston engines are reciprocating type with a linear alternator integrated with the piston or pistons. Linear alternators are heavier than their rotary counterparts. Scavenging of the burnt fuel is also a problem. Additional mechanical or electromagnetically operated valves have to be used in order to obtain sure scavenging and intake in free-piston linear alternators. Linear free-piston engines are unable to produce mechanical energy in rotary form without the use of a gear-based conversion mechanism. Efforts have been made to augment or actuate reciprocating internal combustion engines by using solenoid-type electromagnets; U.S. Pat. No. 4,213,428 discloses electromagnetic reciprocating engine augmentation, while U.S. Pat. No. 4,345,174 discloses an electromagnetic engine with rotating rectilinear cylinders and reciprocating pistons. Patents RU 2235404, CN 1369951 and CN 1457134 also use solenoid-type electromagnetics to augment and/or run reciprocating cylindrical internal combustion engines.

All the present-day toroidal engines struggle to optimize factors like valve operation, mechanical power extraction and leakage. Free piston engines can easily be made multi-fuel operated. However, due to fixed valve positioning, no toroidal engine of prior art can work as a free-piston engine. Some efforts have been made to use windings or magnets to harness power from a toroidal engine, U.S. Pat. No. 4,242,591 and abandoned U.S. patent application Ser. No. 10/244,483. The engine disclosed in U.S. Pat. No. 4,242,591 is a Rankine-cycle engine or a pump with magnets in the lone piston without explaining sufficiently the placement of windings external to the toroidal cylinder; the toroidal cylinder in this disclosure has a piston-operated radial partition valve inside the cylinder. This engine cannot achieve internal compression of fuel-air mixture. U.S. patent application Ser. No. 10/244, 483 from its title, 'Magnetically coupled, sealed chamber toroidal combustion and steam engine,' reads like having come close to being a simple, ideal engine with very little leakage; but the application seems not to have solved the problems with sufficient clarity.

Prior efforts at devising, either a pump, compressor or an engine using electromagnetic driving techniques made more use of mechanical steps rather than utilizing miniature electronics. For hydraulic circuits and domestic refrigerators, there is an acute need for efficient, high-performance, sealed pumps and compressors. A summary of problems associated with existing engines, pumps and compressors are as follows:

1. Cycles wasted in reciprocating rotary internal combustion engines for exhaust and intake.
2. Excessive lubrication required for cranking and valve structures in reciprocating rotary internal combustion engines.
3. Difficulty in implementing free-piston operation in reciprocating rotary internal combustion engines.
4. Inherently unidirectional rotation in reciprocating rotary internal combustion engines.
5. Increased complexities of valve actuation mechanisms for optimum performance of an internal combustion engine.
6. Incomplete scavenging of exhaust gases in reciprocating internal combustion engines, due to the fact that the piston does not move beyond TDC position. This also results in uneven wear of the cylinder inner surface.
7. Use of a compressor for charging a two-stroke diesel engine increases complexity and lowers the efficiency of the engine.
8. Inability to effect compression of air-fuel mixture in a ratchet-less toroidal rotary engine with non-reciprocating piston or pistons.
9. The separation in the drive motor and the pump or compressor leading to the size and weight of such assemblies finding application in pneumatics, hydraulics and refrigeration.

BRIEF SUMMARY OF THE INVENTION

This invention solves the earlier problems and problems enumerated hereinabove principally by electromagnetically switching the functioning of two or more pistons in a fully enclosed, (except for intake and exhaust, or inlet or outlet ports) toroidal, un-partitioned and hollow cylinder with uniformly smooth internal bore of any cross section—preferred cross section being circular. This invention is best understood by visualizing the fully enclosed, toroidal cylinder standing upright with the circular plane formed by the full rotation by outermost radius of the toroidal cylinder perpendicular to the supporting base plane and facing the observer. Two ports spaced radially apart open opposite to the supporting base plane. The circular plane described hereinabove, also forms the joining plane for the two identical toroidal halves jointly forming the toroidal cylinder. The ports are also intersected diametrically by the circular plane which forms the joining plane for the two toroidal halves. If lines are drawn from the respective centers of the two ports to the center of the toroidal cylinder and a third radial line is dropped from the center of the toroidal cylinder to touch the supporting base plane normally, the conjunction of these three lines would look like letter Y, where the upward-facing strokes of the letter denote the lines coming from the respective centers of the two ports, while the downward vertical stroke is the radial line dropping to the supporting base plane from the center of the toroidal cylinder. The angular distance may vary between the two upward-facing strokes, depending upon many factors to be described hereinafter. The functioning of a two-piston device is described first. The two pistons are identical in every respect and are machined to fit the inner toroidal contour of the toroidal cylinder. The pistons have either electromagnetic elements or magnetic elements oriented axial to the toroidal cylinder. The length of the pistons is determined by the angular distance between the two ports. One of the two pistons blocks the passage between the two ports through the toroidal cylinder. This will look like a diacritical mark on letter Ÿ, while the other remaining piston is moving clockwise from the right of the first blocking piston. It looks like a colon on the right side of (Ÿ:). This second piston keeps moving along the inside hollow of the toroidal cylinder, which looks somewhat like (:Ÿ). This movement of the second piston is effected by external clockwise rotation of magnetic field engulfing the second piston, either electromagnetically or mechanically by moving an external electromagnet. At the same time, the first blocking piston is magnetically held in the position Ÿ. When the second piston is crossing the port on the left side (this port is the outlet port due to the direction of rotation in the exampled case being clockwise), either a proximity, a capacitive or an optical sensor gives a signal for the release of the first blocking piston. At the same instance, the external rotating magnet or magnetic field is stopped. If it is a rotating magnetic field, it will stop practically immediately, depending a little on the driving electrical circuit parameters. If it is a rotating electromagnet, removal of power from the electromagnet or reversal of magnetic field of its driving electromagnetic clutch plate, would still make the second piston move due to moment of inertia. In a fraction of time the second moving piston collides with the first blocking piston; and kinetic energy transfer takes place to set the first blocking piston interchanging its function with the second moving piston. Hereafter, a new cycle begins exactly as described earlier. This embodiment of the present invention can work either as a pump or a compressor. It can only handle clean pumping media. Like clean water, oils, chemical solutions and gases.

Instead of a rotating magnetic field placed outside the hollow toroidal cylinder described hereinabove, multiple independent windings are place outside of and around the hollow toroidal cylinder angularly adjacent to one another. The magnetic lines of force from the axially placed magnetic poles of the magnetic elements inside the pistons, cross these multiple windings and induce electric current, with the traveling of the moving piston in another embodiment of the present invention. This embodiment is very similar to the device described to function as a pump or a compressor. The induced currents are rectified using an array of bridge rectifiers and are filtered for use. This device functions as a Rankine- or Stirling-cycle engine to harness solar energy. This engine can also be used to function as an external combustion engine also. To avoid the direct impacting of moving piston on the blocking piston, the windings near the outlet port (or exhaust port) are to act in current mode to be presented with a near short circuit to extract the kinetic energy of the moving piston to the fullest, and then to step up the low voltage, high current electric power to charge a capacitor to a much higher voltage, in order to fast accelerate the stopping piston. In this way the energy transfer takes place from the moving piston to the blocking piston indirectly through an electrical route, and not through direct physical collision. The utilization of pistons interchangeably solves a major problem of diaphragm valve or valves inside toroidal cylinders and their correct actuation. The ongoing description sums up, in brief, how this novel solution enables the functioning of a free-piston internal combustion engine, and a ratchet-less, rotary, toroidal internal combustion engine.

For the fabrication of an internal combustion engine, a third piston is in the present invention as described hereinbefore. The inlet port now acts as intake port and the outlet port works as exhaust port, while the third piston blocks the way of the moving piston to facilitate the compression if fuel-air mixture. The position of the third piston remains angularly on the right of the downward stroke of letter, symbolizes roughly as (Ÿ:). The moving piston moves clockwise between the two just-mentioned pistons to bring about necessary compression to effect a spontaneous or induced combustion, thus facilitating diesel and Otto cycles in the same scheme. As soon as the combustion takes place, an appropriately located pressure transducer sends a signal to effect the interchange of functions of the erstwhile moving piston and the third piston. This interchange is key to the functioning of this engine. This engine has an electromagnetic or magnetic double-disc flywheel and a braking electromagnetic or magnetic ring circularly or semi-circularly encircling the hollow toroidal cylinder. This version of the present invention implements an engine capable of mechanical rotary motion of a shaft. All the three pistons are composed of laminated ferromagnetic elements stacked radially; and around the hollow toroidal cylinder are slidingly mounted two similarly stacked electromagnetic grips. These two electromagnetic grips are individually wound with heat-resistant enameled or insulated wire—preferable aluminum wire to reduce weight. The windings on the two grips receive electric supply from radial, centrally looking brushes, spaced axially apart. These brushes rotationally rub against a central shaft which carries six separate slip rings, two each for every piston. Either external semi-circular surface at the radial end of each pair of grips electromagnetically holding a piston has complementary magnetic poles; similarly, the plain outside twin surfaces of each pair of grips, which look like pi sections, at their distal ends reflect the respective magnetic poles. There are two possibilities for the completion of the magnetic circuit of each pair of grips—one, through the braking electromagnetic or magnetic ring circularly or semi-circularly encircling the hollow toroidal cylinder, or, two, through the electromagnetic or magnetic double-disc flywheel. The magnetic poles the braking ring and the double-disc flywheel are oriented identically, so as to repel each other. The magnetic lines of force in the braking ring emanate from the axial poles flowing radially inwards towards the central shaft. The magnetic lines of force in the double-disc flywheel flow axially, parallel to the central shaft. By determining the polarity of the relevant slip rings, the magnetic orientation of each pair of electromagnetic grips is effected, which in turn determines the position and mobility of each piston regulated by respective pair of grips. If a pair of grips is attracted towards the braking ring, it will decelerate, if in motion, and stop. Conversely, if a pair of grips is attracted towards the double-disc flywheel, it will accelerate, if stationary, and rotate along with the double-disc flywheel.

After the interchange between the statuses of the stopping and moving pistons takes place by electromagnetic reversal of the respective pairs of grips, the hitherto third piston stopping the air-fuel mixture from flowing into the rest of the hollow toroidal cylinder, takes on the role of the moving piston and hitherto moving piston starts doing the stopping function. Now the third piston electromagnetically attaches to the double-disc flywheel and the energy of the post-combustion gases gets transferred to the double-disc flywheel. At this time, the moving-piston having turned into a stopping piston keeps electromagnetically attached to the braking ring. When the third piston attached to the double-disc flywheel nears the exhaust port (outlet port), the present stopping piston also momentarily turns into a moving piston by undergoing an electromagnetic polarity reversal and turn back into a stopping piston again. This makes the present stopping piston reach the combustion homing position—it is a presettable position which determines the cylinder intake swept volume.

It also determines fuel intake in carburetor type fuel injection. Just before reaching the exhaust port, the third piston undergoes an electromagnetic reversal of polarity to leave the double-disc flywheel, and to get attached to the braking ring. Due to the moment of inertia of the mechanical system composed of the pair of grips and the third piston, the third piston keeps moving for a while before coming to a halt. A little after the third piston undergoes electromagnetic polarity reversal and prepares to come to a halt, the blocking piston, stationary all this while, also undergoes electromagnetic reversal to leave the braking ring and to turn into the moving piston to compress the air-fuel mixture already in the intake swept space—which happened during the earlier compression and subsequent moving of then stopping piston to combustion homing position. Thus a new combustion cycle is initiated.

The second version of the internal combustion engine of the present invention functions as an electrical generator. This electrical generator consists of a ferromagnetic circuit fully encapsulating the hollow toroidal cylinder already described. As use is not made of the electromagnetic grips, double-disc flywheel and braking ring; the functions of these elements are accomplished by switching and rectification of voltages to and from numerous windings forming the ferromagnetic circuit. A section of the windings on the ferromagnetic circuit are made to function as a linear BLDC motor or stepper motor to achieve initial compression and the resultant combustion. The pistons are identical, with two separate permanent magnets opposed to each other oriented axially to the toroidal cylinder. After the interchange of functions of the erstwhile moving piston and the third piston as described hereinbefore, the windings further on, in the way of the third piston having turned into power-producing moving piston, convert the mechanical energy of the power producing moving piston into electric current of variable voltages. An array of diodes rectifies the different electric waveforms to produce a dc output. In the absence of any mechanical energy storage device in this version of the present invention, capacitors connected to the array of diodes act as short-term energy reservoirs to supply power for the resumption of the next compression of air-fuel mixture, in addition to smoothing the ripples in the rectified output waveform from the array of diodes. In a further step, the length of each identical piston is set to half of the angular distance between the adjacent inside edges of the intake and exhaust ports, and the number of pistons is incremented by one. This step avoids full dependence on electrical energy storage capacitors for the resumption of the compression of air-fuel mixture. After the first combustion, the next compression and combustion are over just before the power-producing piston reaches the exhaust port; in this way, the electrical power from the power-producing piston is partially used for next compression and resultant combustion without any time lapse. In this step, two pistons always remain as blocking pistons between the intake and exhaust ports—as one of the blocking piston leaves its place to act as a compressor piston, the other blocking piston behind it moves after a short delay to take its vacated position, and during this short delay the power-producing piston crosses the exhaust port to occupy the place vacated by the other blocking piston. This version of the internal combustion electrical generator operates with less volume of air-fuel mixture compared to a version of the present invention with just three pistons. The second version of the internal combustion engine of the present invention, functioning as an electrical generator, is capable of high compression ratios, due to the fact that the hollow toroidal cylinder basically is formed as a cavity in a block made of ferromagnetic material with bonded electrical windings forming a composite. With more number of pistons, the last mentioned version of the present invention produces less vibration, as the pistons are distributed with more angular uniformity inside the hollow toroidal cylinder.

The description of the present invention till now has been made with reference to all the rotations and movements taking place in clockwise direction. Just by reversing the rotation of the two pistons in the first embodiment of the present invention, the pump or the compressor would function in complementary fashion, that is, the inlet port becoming the outlet port and vice versa. In the engine or electrical generator embodiment of the present invention, exchanging the intake and exhaust ports with each other would reverse the direction of rotation of the engine or the electrical generator. But, in order to allow such dual-direction rotation, either the angular length of the braking plate or the linear motor has to be increased; and a mechanism to reverse intake and exhaust has also to be incorporated. The preceding summary of the functioning of the present invention also makes evident its ability to solve existing problems in engine design. Some relevant features of the present invention are as follows:

1. No cycles are wasted in exhaust and intake.
2. No extra lubrication required for cranking and for valve structures.
3. An easy implementation of free-piston operation.
4. Two-directional rotation of the engine is possible with just interchanging of ports.
5. Valve operation is integrated with piston movements, without using any extra valve-actuators.
6. Full and uniform sweep through the hollow toroidal cylinder of all the pistons, insures full scavenging of exhaust gases and uniform wear of the cylinder inner surface.
7. Charging of the air-fuel mixture is inbuilt in the engine operation.
8. Ability to effect compression of air-fuel mixture in a toroidal with non-reciprocating pistons, without using any ratchets and valves needing opening for external actuation.
9. The fusion of the drive motor and the pump or compressor leading to size, weight and leakage reduction for application in pneumatics, hydraulics and refrigeration.

Accordingly, a principle object of the present invention is to devise an easily reversible, energy conversion electromagnetically controlled apparatus to convert chemical energy produced from combustion of gases or hydrocarbons into kinetic energy in rotational form for further conversion into mechanical work or electricity.

Another principle object of the invention is to use heat differentials to produce kinetic energy in rotational form for further conversion into mechanical work or electricity.

It is a further object of the invention to use a single, unpartitioned, hollow, toroidal-shaped cylinder and more than two pistons for devising an internal-combustion engine where at least one or more than one combustion can take place with every full revolution of a piston.

Another object of the invention is to use a single, unpartitioned, hollow, toroidal-shaped cylinder and two pistons for devising either an external-combustion, Stirling-cycle or Rankine-cycle engine.

An additional object of the invention is to make a linear electrical generator or an alternator in a toroidal form fully encircling an engine with a single, un-partitioned, hollow, toroidal-shaped cylinder, a number of magnetic pistons, and without any dedicated, externally actuated valves.

Another additional object of the invention is to devise a magnetically oriented, toroidal liquid-cooled jacket for cooling, reinforcement and electromagnetic control of an electromagnetically controlled toroidal engine or pump.

One more object of the invention is to vary the combustion location inside a single, unpartitioned, hollow, toroidal-shaped-cylinder in a cyclic or preset manner, or under a command, to spread the heating stress-cycling of the cylinder over a certain length of the cylinder, and/or to vary the power output from an engine made with such a cylinder.

An added principle object of the invention is to make a pump or a compressor using a single, unpartitioned, hollow, toroidal-shaped cylinder with more than one piston, and to have an electromagnetic drive to the pistons.

A further principle object of the invention is to make a toroidal electric motor with wound stator and magnetic or electromagnetic toroidal segment rotor or rotors for doing useful work on various liquids and gases.

BRIEF DESCRIPTION OF THE SEVERAL VIEWS OF THE DRAWINGS

There are 22 drawings presented to describe the present invention. In FIG. 1A through FIG. 6, large dot ● put on the piston surface denotes a stationary piston, similarly arrow → put on the piston surface shows a moving piston, including the direction of the movement; asymmetric star * shows combustion in a volume enclosed a stationary and a moving piston; and multiple wavy lines with arrowheads show fluid or gas flow.

FIG. 1A is a schematic depiction of the internal combustion engine with three identical pistons of the present invention at the preferable start position.

FIG. 1B is a schematic depiction of the internal combustion engine of the present invention with three identical pistons at the first combustion.

FIG. 1C is a schematic depiction of the internal combustion engine of the present invention with three identical pistons during post-combustion expansion of hot gases.

FIG. 1D is a schematic depiction of the internal combustion engine of the present invention with three identical pistons at the completion of the second intake.

FIG. 1E is a schematic depiction of the internal combustion engine of the present invention with three identical pistons at the beginning of the second compression.

FIG. 1F is a schematic depiction of the internal combustion engine of the present invention with three identical pistons at the second combustion.

FIG. 2A is a schematic depiction of the internal combustion engine of the present invention with four identical pistons at the preferable start position.

FIG. 2B is a schematic depiction of the internal combustion engine of the present invention with four identical pistons at the completion of first intake.

FIG. 2C is a schematic depiction of the internal combustion engine of the present invention with four identical pistons just at the first combustion.

FIG. 2D is a schematic depiction of the internal combustion engine of the present invention with four identical pistons showing completion of second intake and expansion of hot gases following the first combustion.

FIG. 2E is a schematic depiction of the internal combustion engine of the present invention with four identical pistons at the second combustion.

FIG. 2F is a schematic depiction of the internal combustion engine of the present invention with four identical pistons showing the expansion of hot gases following the second combustion and the scavenging of gases left from the first combustion.

FIG. 3A is a schematic depiction of the pumping device of the present invention at the start position.

FIG. 3B is a schematic depiction of the pumping device of the present invention showing the start of cycle.

FIG. 3C is a schematic depiction of the pumping device of the present invention just prior to the first interchanging of piston movements.

FIG. 3D is a schematic depiction of the pumping device of the present invention showing the start of the second cycle after the first interchange of piston movements.

FIG. 3E is a schematic depiction of the pumping device of the present invention showing the second-time piston-movement interchange.

FIG. 3F is a schematic depiction of the pumping device of the present invention showing the start of the third cycle.

FIG. 4 is a schematic diagram of the internal-combustion engine of the present invention with three identical pistons showing the windings forming the four electromagnets. The electrical windings of various electromagnets have one terminal each marked with dot showing the start of the winding, with every winding wound in identical direction.

FIG. 5 is a schematic wave diagram of various voltages supplied to the windings during one full rotation of the output shaft of the internal-combustion engine shown in FIG. 4.

FIG. 6 is a schematic diagram of the internal-combustion engine of the present invention with four identical magnetic pistons showing the windings forming the four electromagnets. A schematic diagram of a toroidal linear electric generator cum linear motor with major power-electronics circuits is also shown integrated with the engine. The electrical windings of various electromagnets have one terminal each marked with dot showing the start of the winding, with every winding wound in identical direction.

DETAILED DESCRIPTION OF THE INVENTION

FIG. 1A through FIG. 1F show the workings of the internal-combustion engine of the present invention with three pistons. Pistons marked A, B and C, are fully identical and have ferromagnetic properties. They are denoted separately as A, B and C to explain properly their working interrelations in the engine. Pistons A, B and C are slidably fitted inside hollow toroidal cylinder CY. There are two angularly spaced ports I and E, positioned on the outermost circumferential periphery of CY. Here I functions as the intake port, and E is the exhaust port. The clearances between the inside surface profile of hollow toroidal cylinder CY and the outer semi-toroidal profile of pistons A, B and C are such as to effect sufficient volumetric compression of combustible gases to lead to triggered or spontaneous combustion inside hollow toroidal cylinder CY, and yet to allow smooth sliding movement of pistons A, B and C in the presence of adequate lubrication.

Figure 10:
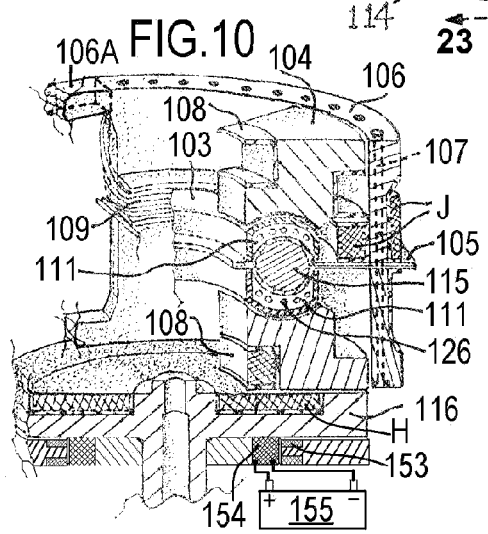
FIG. 10 is a partial, diagrammatic cut-away approximate view taken along 23-23 in FIG. 9A with only those details which help in the understanding of the electromagnetic orientation of the internal-combustion rotary engine of the present invention.

FIG. 1A shows the preferable position for pistons A, B, and C for stopping. This position prevents the entry of outside gases and contaminants from entering hollow toroidal cylinder CY during the long durations when the engine is not running. Piston C moves clockwise, intakes combustible gas or gases in the form of hydrocarbon/hydrocarbons HYD through port I, and stops at a predetermined position which is determined by expected output from that combustion cycle and engine efficiency (FIG. 1B); then piston B too starts moving in clockwise direction, compressing the combustible intake of hydrogen/hydrocarbons HYD lying between stationary piston C and itself. Combustion takes place (FIG. 1B) after sufficient or required amount of compression, in either a triggered (by electrical discharge ELD in FIG. 1B) or spontaneous manner. As soon as the combustion takes place, a combustion sensor CSN senses it and the statuses of the two pistons B and C are reversed electromagnetically from elements (not shown in FIG. 1A through FIG. 1F) placed outside hollow toroidal cylinder CY. Piston B turns into a stationary piston and piston C is released to move further in clockwise direction, pressed by the hot burnt gases BGS after combustion. Piston C transfers power to external electromagnetically coupled elements which mainly consist of an alternator (sator 153, rotor 154, FIG. 10) and an electrical storage means, rechargeable battery 155 (FIG. 10). When piston C is nearing exhaust port E, piston B moves for a brief while to stop at the position vacated by piston C after the combustion. In FIG. 1D, piston C is making a crossing of port E; at this point piston A is electromagnetically released to start a new compression cycle leading to another combustion (FIG. 1E). In the meantime, the burnt gases BGS find an escape through port E (FIG. 1F); but after the second combustion (FIG. 1F), the power-releasing movement of piston B (not shown) facilitates complete scavenging.

Similar to the narrative of hereinabove, FIG. 2A through FIG. 2F illustrate the basic workings of a similar internal-combustion engine with four identical pistons V, W, X and Y. At the beginning of the engine operation, the four pistons V, W, X and Y are at positions shown in FIG. 2A. This, as mentioned earlier also, prevents the entry of outside elements in hollow toroidal cylinder CY. In FIG. 2B, piston Y is shown moved to a predetermined position to facilitate combustion. In FIG. 2C, piston X moves in clockwise direction to compress the intake gas or gases to effect combustion in a manner similar to as described before. At the same time, pistons V and W move clockwise to occupy corresponding stationary positions (FIG. 2C). In FIG. 2C, combustion is also shown taking place between pistons X and Y. In FIG. 2D, piston X has already moved to the predetermined position to facilitate combustion of the next intake, as described for the first cycle. But before this movement takes place, at the very instant of combustion (an event spanning around tenth of millisecond), the statuses of the two pistons X and Y are reversed electromagnetically from elements (not shown in FIG. 2A through FIG. 2F) placed outside hollow toroidal cylinder CY. Piston X turns into a stationary piston and piston Y is released to move further in clockwise direction, pressed by the hot gases after combustion. Piston Y transfers power to external electromagnetically coupled elements (not shown in FIG. 2A through FIG. 2F). In FIG. 2D, piston W is also shown as having started moving in clockwise direction to begin compression of the intake between stationary piston X and compressing piston W. FIG. 2E shows the second combustion taking place between pistons W and X. Just before this combustion piston Y kept on moving clockwise transferring power in the manner described before; the position of piston Y is shown having reached port E in FIG. 2E during this movement of transferring power. The burnt gases have not yet found an outlet after expanding inside hollow toroidal cylinder CYL in FIG. 2E. Now, FIG. 2F shows pistons Y and V having reached blocking position between ports E and I; the burnt gases from the first combustion are being pushed out by the movement of piston X in consequence to the second combustion between pistons X and Y, and after the status interchange between the two pistons.

FIG. 3A through FIG. 3F show various stages of the working of an energy conversion device converting chemical, solar and thermal forms of energy into mechanical and/or electrical form. This energy conversion device also functions as a pump or a compressor, when a torque or systematic electrical energy is applied to pistons R and S (FIG. 3A through FIG. 3F). The operation of a pumping device of the present invention is explained first. The operation of a heat engine would not be difficult to understand after this. FIG. 3A shows the beginning of the pumping cycle. Pistons R and S can remain at positions slightly counterclockwise to the ones shown in FIG. 3A, in order to keep both the ports P1 and P2 blocked, so that no outside elements find entry during the long periods of non-operation. In FIG. 3B, piston S is shown moving clockwise, sucking the gas or fluid medium outside port P1. Piston R remains fixed between ports R and S to keep the free passage between ports P1 and P2 blocked. FIG. 3C shows piston S having made full clockwise movement to reach port P2; at this point, an appropriately placed sensor triggers the electromagnetic release of piston R and removal of electromagnetic drive from piston S. An energy exchanging collision takes place between pistons S and R, and the kinetic energy of piston S is transferred to piston R. In FIG. 3D, piston R goes into clockwise movement to repeat the pumping action conducted by pistons in FIG. 3B and FIG. 3C. FIG. 3E. FIG. 3F shows the start of the third pumping cycle.

The operation of a heat engine based on expanded gases or fluids is easy to follow after the above-given description of the operation of a pumping device of the present invention. In FIG. 3A through FIG. 3F, ports P1 would function as the port which is connected to the heated chamber of gases or fluids, and P2 would function as the outlet for the hot gases or fluids after transferring some of their energies alternatively to pistons R and S through electromagnetic means (not shown).

Figure 4:
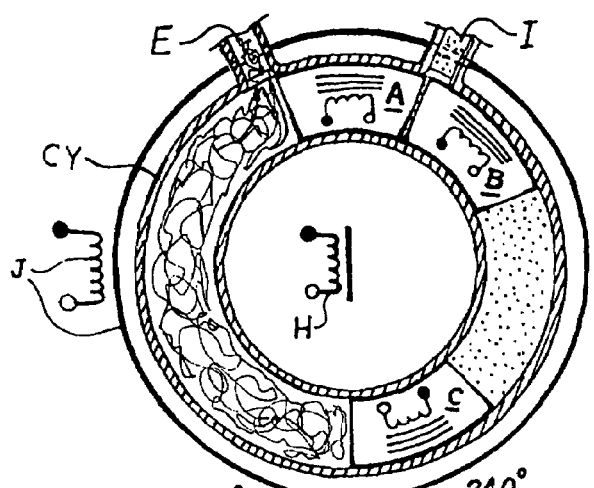
Figure 5:
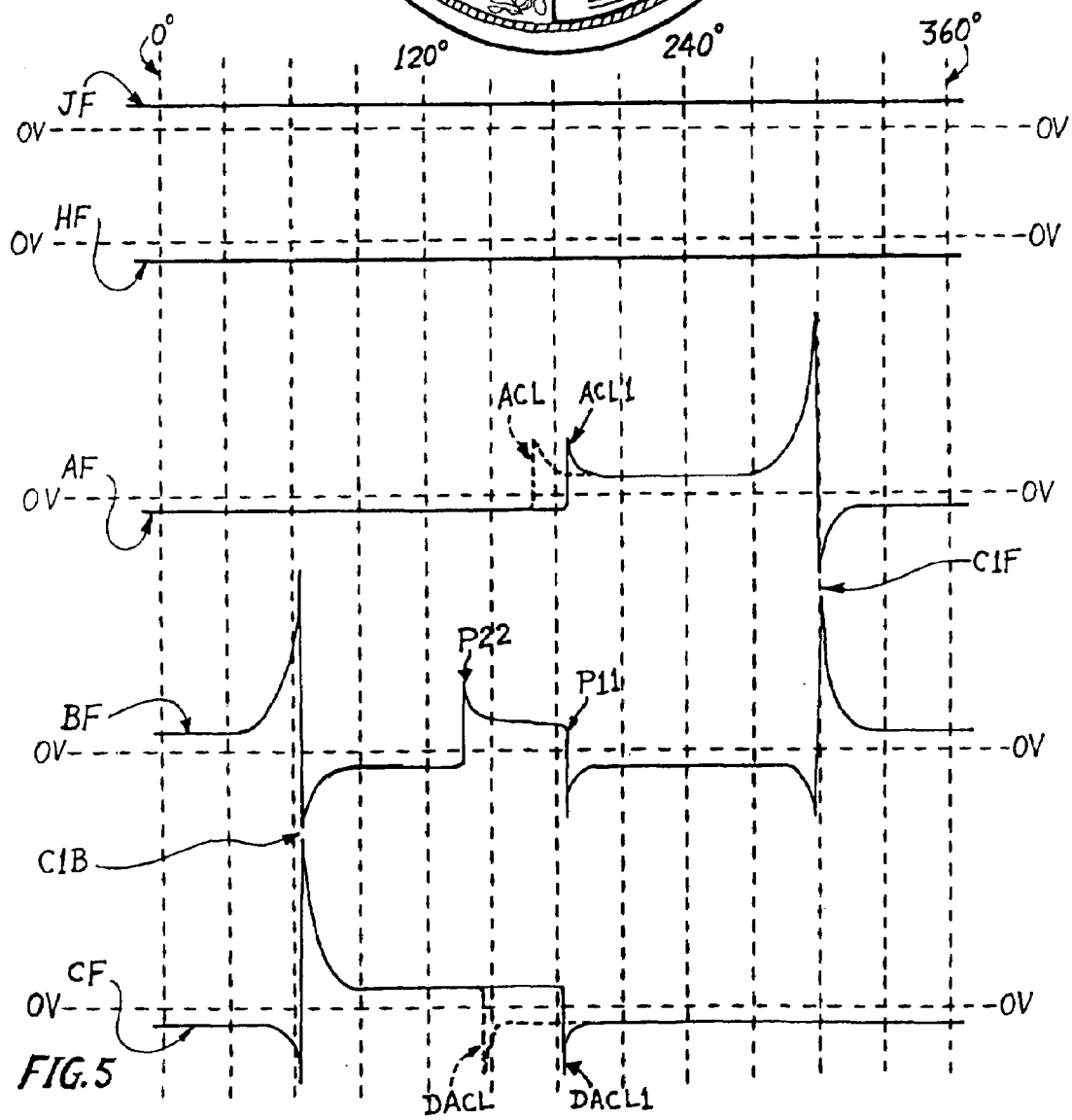

FIG. 4 shows three electromagnetically controlled identical pistons A, B and C inside hollow toroidal cylinder CY. There are two ports I and E, meant to work as intake and exhaust ports or vice versa. This depiction in FIG. 4 is essentially similar to the ones shown in FIG. 1A through FIG. 1F, except for the addition of the electromagnetic control elements, windings of electromagnetic pairs of grips for controlling pistons A, B and C, electromagnetic braking ring winding J and double-disc electromagnetic flywheel winding H. The position of the pistons A, B and C inside hollow toroidal cylinder CY depicts the point during the full cycle of the operation of the internal-combustion engine of the present invention shown in FIG. 1E. FIG. 5 is a schematic waveform diagram or a multi-trace oscillogram of various voltages supplied to the windings during one full rotation of the output shaft of the internal-combustion engine shown in FIG. 4. All the waveforms are shown in analogue form, these can be substituted with a pulse-width modulated (PWM) voltage from a single voltage source. Every individual trace is referenced with zero volt line 0V-0V. All the five traces in FIG. 5 are marked with reference to the electromagnetic windings they specifically belong to: waveform JF is the voltage supplied to electromagnetic braking ring winding J, waveform HF is the voltage supplied to double-disc electromagnetic flywheel winding H, waveform AF is the voltage supplied to windings of electromagnetic pair of grips for controlling piston A, waveform BF is the voltage supplied to windings of electromagnetic pair of grips for controlling piston B, and waveform CF is the voltage supplied to windings of electromagnetic pair of grips for controlling piston C. To show the timing interrelations vertical broken lines are used. C1B shows the timing of the first combustion taking place in the compressed intake lying between pistons B and C. The beginning of the timing lines in FIG. S is marked as 0°, which denotes the position of pistons A, B and C as depicted in FIG. 4. Every next vertical broken line marks a 30° angular movement (120°, 240° and 360° are printed by double-disc electromagnetic flywheel winding H. This is an ideal picture, in practice, however, there is a slip between double-disc electromagnetic flywheel winding H and pistons A, B and C. C1F shows the timing of the second combustion taking place in the compressed intake lying between pistons A and B. P22 and P11 on waveform BF mark the approximate duration of voltage applied windings of electromagnetic pair of grips for controlling piston B. ACL and ACL1 span a deviation in waveform AF to compensate for the acceleration time taken by piston A to match the rotational velocity of double-disc electromagnetic flywheel. Similarly, DACL and DACL1 span a theoretically premature change in waveform CF to compensate for the movement of piston C and its pair of grips due to their collective moments of inertia.

Figure 6:
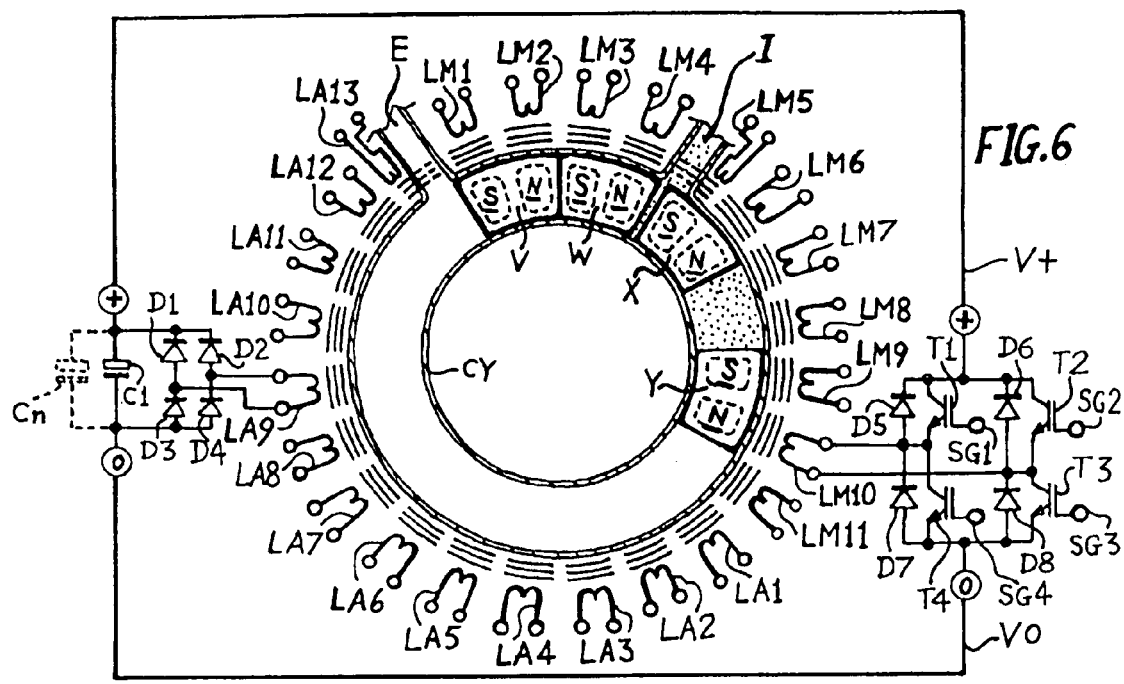

The internal-combustion engine shown in FIG. 6 has four identical pistons V, W, X and Y; the basic functioning of this engine has been explained hereinbefore with the help of FIG. 2A through FIG. 2F. Every piston has at least two permanent magnets, oriented axially to the axis of hollow toroidal cylinder CY, placed side by side with their magnetic poles (individually marked as S and N on pistons V, W, X and Y in FIG. 6) opposing each other. These are high-intensity magnets made of rare-earth elements, having Curie temperatures higher than 500° C. The magnetic orientation of the pair of magnets insures high flux variations leading to good alternator performance, and no magnetic permanence of the stator windings LM1 through LM11 and LA1 through LA13 (FIG. 6) of the toroidal linear electric generator cum linear motor. The electrical windings of all the stator windings in FIG. 6 have one terminal each marked with dot showing the start of the winding, with every winding wound in identical direction. Stator windings can be of two kinds, toroidal linear motor and toroidal linear generator. If winding and component scheme of LM1 through LM11 is utilized, it can work both as a toroidal electric generator and linear motor with the help of H-type inverter (T1, T2, T3, T4, D5, D6, D7 and D8) driven from a driver circuitry (not shown) connected to signal inputs SG1, SG2, SG3 and SG4 of switching IGBTs T1, T2, T3 and T4, with freewheeling diodes D5, D6, D7 and D8. Freewheeling diodes D5, D6, D7 and D8 also function as a bridge rectifier when emf is induced due to changes in the adjacent magnetic field of the stator winding connected to them. These changes in adjacent magnetic field take place due to the sliding movement of pistons V, W, X and Y powered by corresponding internal combustion. The rectified dc voltage produced by every bridge rectifier is stored in capacitor bank C1 through Cn (FIG. 6). The capacitor bank acts as an electrical energy reservoir to replace the double-disc flywheel of the version of the internal-combustion engine of the present invention depicted in FIG. 4 and discussed hereinbefore in some detail. Electrical output is to be drawn from dc bus V+ and V0. As pistons V, W, X and Y in FIG. 6 move at a higher speed inside hollow toroidal cylinder CY, the construction of CY has to be such as to avoid undue eddy-current losses in CY. More details regarding the construction technique for hollow toroidal cylinder CY can be had from FIG. 8A: hollow toroidal cylinder CY can be reduced to barely a lubricated lining inside a block of ferromagnetic circuits, which have a cavity conforming exactly to CY outer dimensions. The ferromagnetic circuit has to be made using either a laminated construction or special sintered materials. This kind of strong cylinder construction is suitable for achieving high compression of the combustible gases or mixture. High compression ratios lead to high temperatures inside the combustion region. But high temperatures can damage the magnets inside pistons V, W, X and Y. It is also important to have light-weight pistons to reduce their moments of inertia; this can be done by reducing the diameter of the pistons V, W, X and Y, and by increasing the diameter of hollow toroidal cylinder CY. A scheme of electrical regenerative braking is discussed in the prior section. This scheme extracts the kinetic energy of the piston nearing exhaust port E after converting it into an emf. This electrical power is stepped up in voltage by making use of switching circuits; this higher voltage is used to rapidly accelerate the adjoining stationary pistons to begin a fresh compression and consequent combustion.

Figure 7:
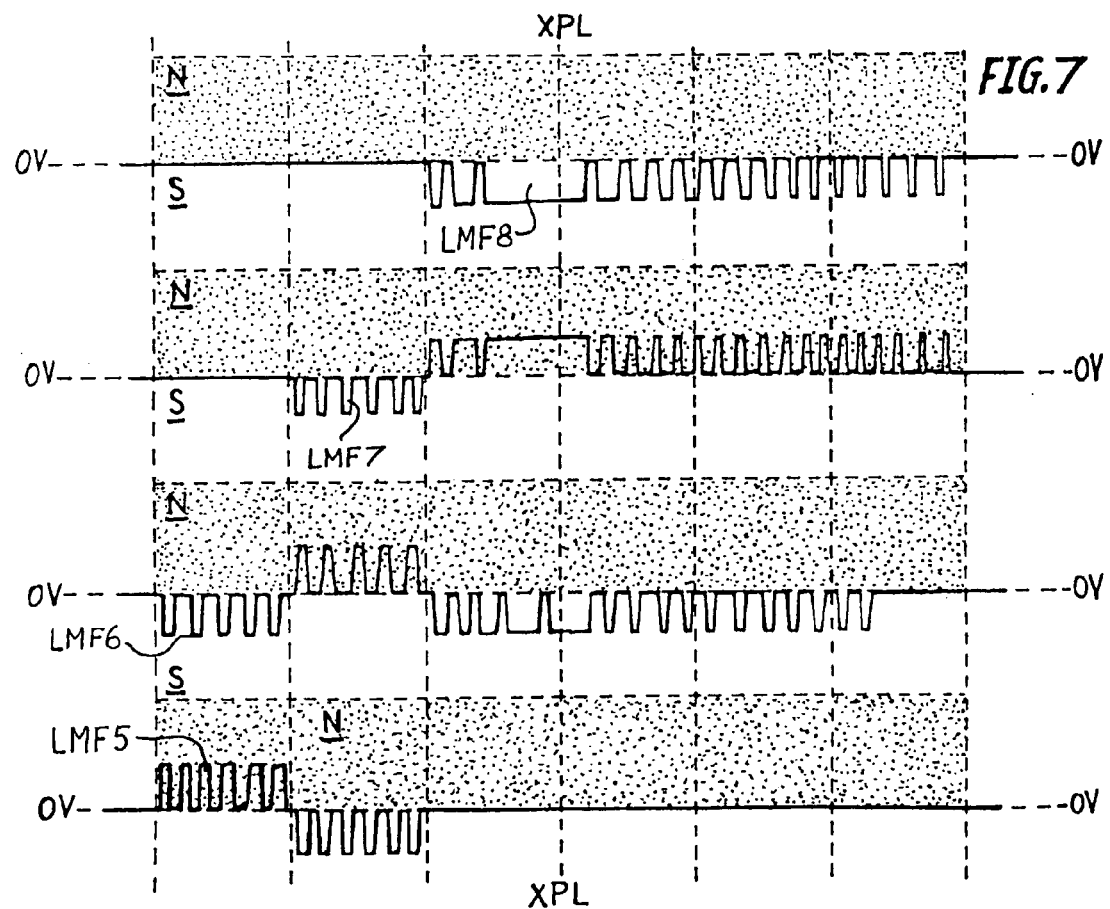
FIG. 7 is a schematic wave diagram of various PWM voltages supplied to the windings during compression, combustion and post-combustive expansion of gases in the internal-combustion engine shown in FIG. 4. The stippled bands show the magnetic polarity of corresponding electromagnets to illustrate the magnetic interrelation of concerned electromagnets during combustion.

In the schematic oscillograms of FIG. 7 a PWM alternative to analogue voltage modulation of FIG. 5 is shown with reference to winding-switching sequence relevant for the engine shown in FIG. 6 and already described. The broken lines 0V-0V show zero volt reference for each individual oscillogram. Waveforms LMF5 through LMF8 show the polarity and PWM voltages supplied to corresponding windings in FIG. 6, namely, LM5 through LM8. The stippled bands on each zero volt reference 0V-0V show the formation of a north pole facing the north poles marked on pistons V, W, X and Y, corresponding to a specific electrical energization of a specific winding out of LM5 through LM8. In FIG. 7 broken line XPL-XPL shows the common time line for the first combustion taking place between the stationary piston Y and the moving piston X after sufficient compression (FIG. 6).

Figure 8A:
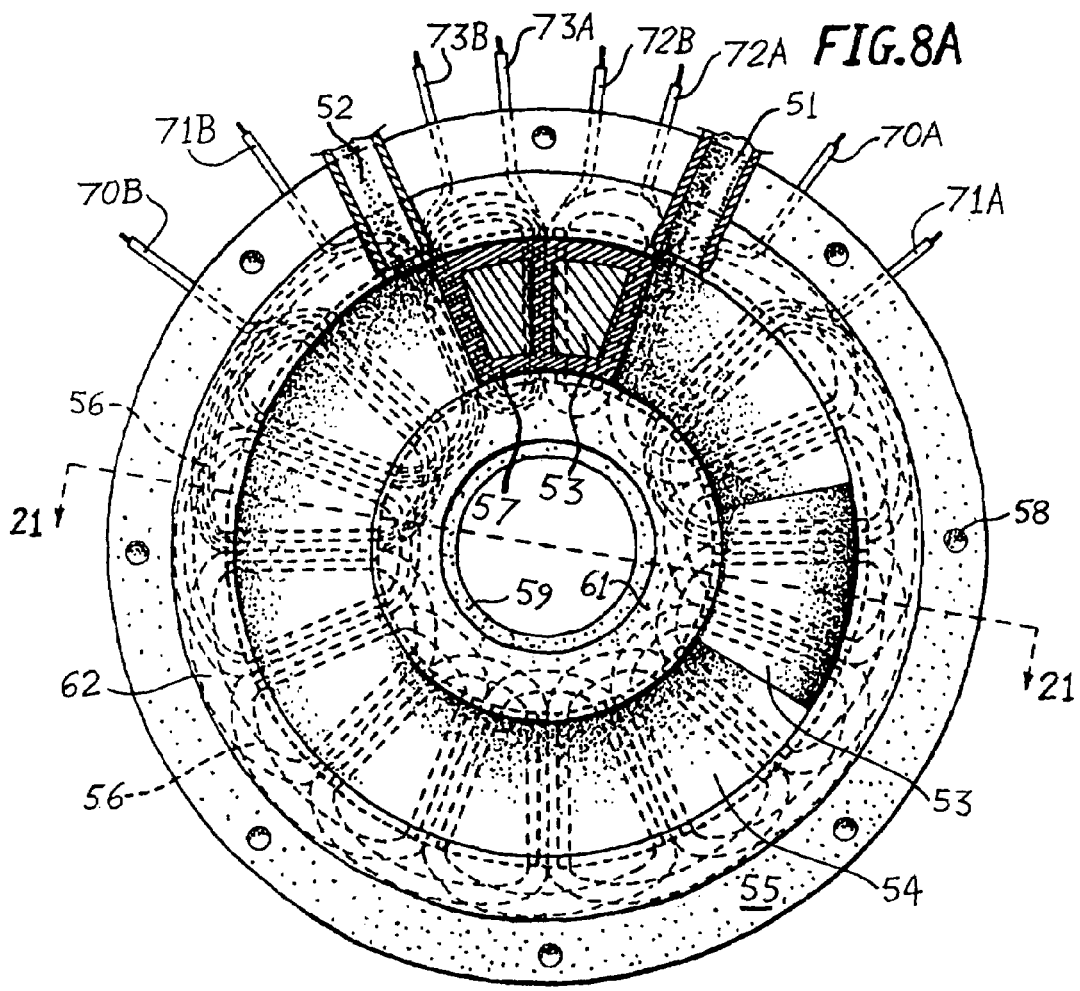
FIG. 8A is a plan view of the pumping device of the present invention. For showing more details, the top half of the horizontal section of the pumping device is removed, with the blocking piston between the two ports shown in horizontal section for showing the shorted-secondary construction.
Figure 8B:
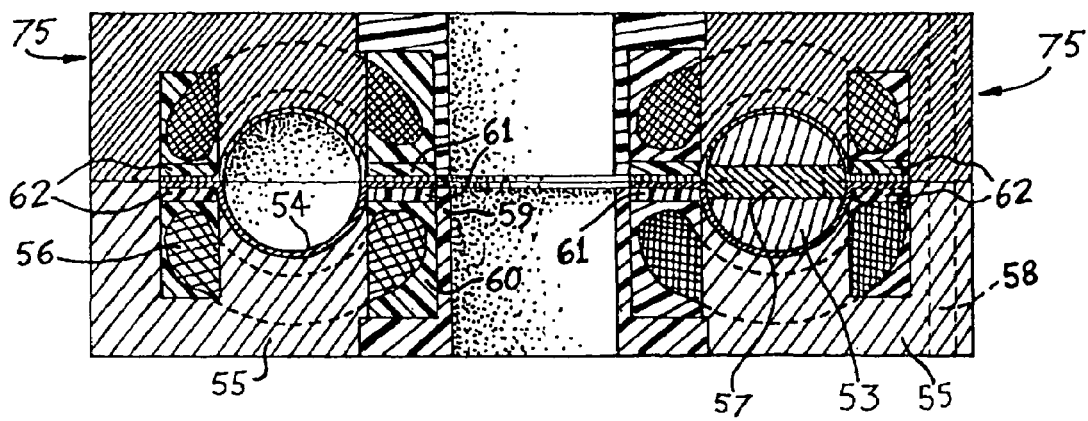
FIG. 8B is a cross-sectional view taken along line 21-21 in FIG. 8A with the details of the top half of the horizontal section of the pumping device (removed in FIG. 8A) included.

A pumping device of the present invention is built easily by using half stator 55 (FIG. 8A and FIG. 8B) of either laminated or sintered construction to reduce eddy-current losses in half stator 55. The mechanical construction shown in FIG. 8A and FIG. 8B is the basis for fabrication of an internal-combustion engine functionally already described in detail with the help of FIG. 4 and FIG. 5. The hollow toroidal cylinder made by joining two symmetrical halves; one symmetrical half 54 shown in FIG. 8A and FIG. 8B. Symmetrical half 54 is easily made by pressing and machining. Piston 53 is mainly a ferromagnetic semi-toroidal segment with shorted secondary winding 57 (FIG. 8A and FIG. 8B). Winding 56 (FIG. 8A and FIG. 8B) is wound in the manner capacitor-run induction motors are wound; phase winding terminations 70A, 70B and 71A, 71B are left for external connections. Two more windings shown by their terminations 72A, 72B and 73A, 73B, function jointly as electromagnetic brakes to both the pistons 53 to hold them alternatively to block the passage between ports 51 and 52. When one piston 53 has to be released and second piston 53 has to be brought in its blocking position, the two windings with terminations 72A, 72B and 73A, 73B are either briefly connected in series with the phase winding terminations 70A, 70B and 71A, 71B, to be a part of the rotating magnetic field induced by the two phase windings. This brief connection is made using bidirectional semiconductor switches. After the piston shifting takes place (described earlier with the aid of FIG. 3A through FIG. 3F), piston 53 in blocking position is held in place against the pressure differential between port 51 and port 52 by applying a braking voltage commonly to the windings shown by their terminations 72A, 72B and 73A, 73B. Annular matching rings 62 and 61 are made of resilient industrial thermoplastics or composite material to press the two symmetrical halves 54 together (FIG. 8A and FIG. 8B) to function as the hollow toroidal cylinder of the present invention. Potting compound 60 (FIG. 8B) is used to fill up the empty spaces after winding 56 is put in place in the slots meant for this purpose in half stator 55 and center flange 59 is fitted. Center flange 59 is made of a dielectric material resistant to high temperatures. Hole 58 (FIG. 8A and FIG. 8B, 4 in number) is for passing a fastener each to secure both half stators 55 together. All the precautions associated with the manufacture of a transformer are to be observed in the construction of the pumping device of the present invention described being here. The use of clamping and fastening material besides the one just described need to be such as to minimize eddy-current losses in the pumping device. The toroidal induction motor functioning to power the pumping device of the present invention basically does not have shorted secondary windings facing all the stator windings. The primary windings would behave like primary winding of a transformer with an inductance connected in series. The turns for the primary winding have to be calculated with reference to the length of piston 53 which determines the number of primary windings faced by shorted secondary windings inside piston 53. An increase in the length of piston 53 would mean a better utilization of the primary winding; but it would also increase the mass of piston 53 and a decrease in the swept volume of the pumping device of the present invention. A collision between pistons 53 is unavoidable in the pumping device of the present invention using an induction-motor drive being described. Selection of a small bore diameter and a large diameter for the toroid forming the hollow toroidal cylinder would comparatively reduce the moment of inertia of piston 53 somewhat. The piston faces have to be accurately machined for good inter-piston-face matching. The piston faces have to be hardened, if high-temperature operation is expected. For medium-temperature operations resilient linings for the piston faces can be used to buffer the collisions. In the pumping device described here, the magnitude of collision is reduced due to either opposing pressure from port 52 or suction from port 51, once the electromagnetic forces decrease, as piston 53 crosses port 52 and readies to turn into a blocking piston (FIG. 8A). A sensor (not shown) is placed through port 52. The sensor can be in the form of an opto-electronic device, if the pumping medium is not fully opaque. Otherwise the sensor can be of proximity type. This sensor signals to the bi-directional semiconductor switching devices for piston-function interchange. The manipulation of the windings shown by their terminations 72A, 72B and 73A, 73B can also be done by the use of a separate small inverter to directly connect to these windings. This inverter produces a two-phase ac or a dc braking voltage, to effect piston interchange and holding of blocking pistons 53, for the operation of the pumping device of the present invention.

The cooling of the pumping device of the present invention can take place with the flow of the medium being pumped. Alternatively, the whole of the pumping can be immersed in an appropriate oil, to carry away the heat to dissipaters. Liquid cooling can also be accomplished by ducts in half stator 55, which carry a cooling fluid. A heat engine to operate similarly can be built. Instead of piston 53 accomplishing work on the medium to be pumped, the pressure differential between port 51 and 52 makes piston 53 move inside the hollow toroidal cylinder assembled by joining symmetrical halves 54 (FIG. 8A and FIG. 8B). Both piston 53 have to have permanent magnets as described hereinbefore with the aid of FIG. 4 and FIG. 5: only difference being, there is no internal compression and consequent combustion taking place inside hollow toroidal cylinder CY (FIG. 4). As no compression is needed, the components needed for making the linear BLDC-motor section are decreased and shifted in the surroundings of port 51 and port 52 (FIG. 8A). The linear alternator or electric generator surrounds the greater circumferential distance between port 51 and port 52 (FIG. 8A). The interchange of pistons 53 is done in a manner essentially similar to the one described earlier, except for the fact that now the linear BLDC motor is used to do the interchange. Collision between pistons 53 can now be avoided by electromagnetically decelerating the moving piston 53 before it crosses port 52. This is not possible when making use of an induction-motor-type drive described earlier with the help of FIG. 8A and FIG. 8B. It is also easy to reverse either the direction of flow or the direction of rotation of pistons 53. It is done by interchanging port 51 with port 52, which is to let the medium enter the heat engine of the present invention from port 51 so that to exit from port 52, and in the case of the pumping device, by reversing the direction of rotation of pistons 53.

A small bore diameter and a large diameter for the toroid forming the hollow toroidal cylinder increases the suitability of the cylinder for high-pressure operations. By decreasing the diameter of the pistons, the leakage between the piston and the cylinder bore is minimized; there is also less difference between the inner and outer diameters of the toroidal cylinder, making it easier to fabricate radially oriented laminations for making the electromagnetic circuits encircling the hollow toroidal cylinder. This advantage of using a large diameter hollow toroidal cylinder for making a heat or internal-combustion engine, lends well for integrating the stator of a ring motor with the electromagnetic circuits encircling the hollow toroidal cylinder. The rotor of the ring motor can be composed either of uniformly distributed permanent magnets or squirrel-cage type shorted secondary windings. The rotor is fitted with the use of rolling bearings on the stator of the ring motor, made strong due to its integration with the electromagnetic circuits encircling the hollow toroidal cylinder of an engine of the present invention. This large diameter ring-engine motor presents a large outside surface for effective dissipation of heat. Reference is made to FIG. 8B to explain the construction of a ring-engine motor; the cylindrical side 75 of the assembly made by the joining of two half stators 54, are provided with slots to hold the stator winding. Alternatively, cylindrical side 75 (FIG. 8B) positions the rolling bearings on the two extremities, and the stator assembly is clamped between the two rolling bearings. Using this technique, a wheel-engine motor is made, which is light in weight. All the wheels of a vehicle can be powered using the wheel-engine motors of the present invention. The application of the wheel-engine motors of the present invention frees the space occupied by the engine in a present-day motor vehicle. With the advantage of free-piston operation, the wheel-engine motor can run on many combustible fuels.

Figure 9A:
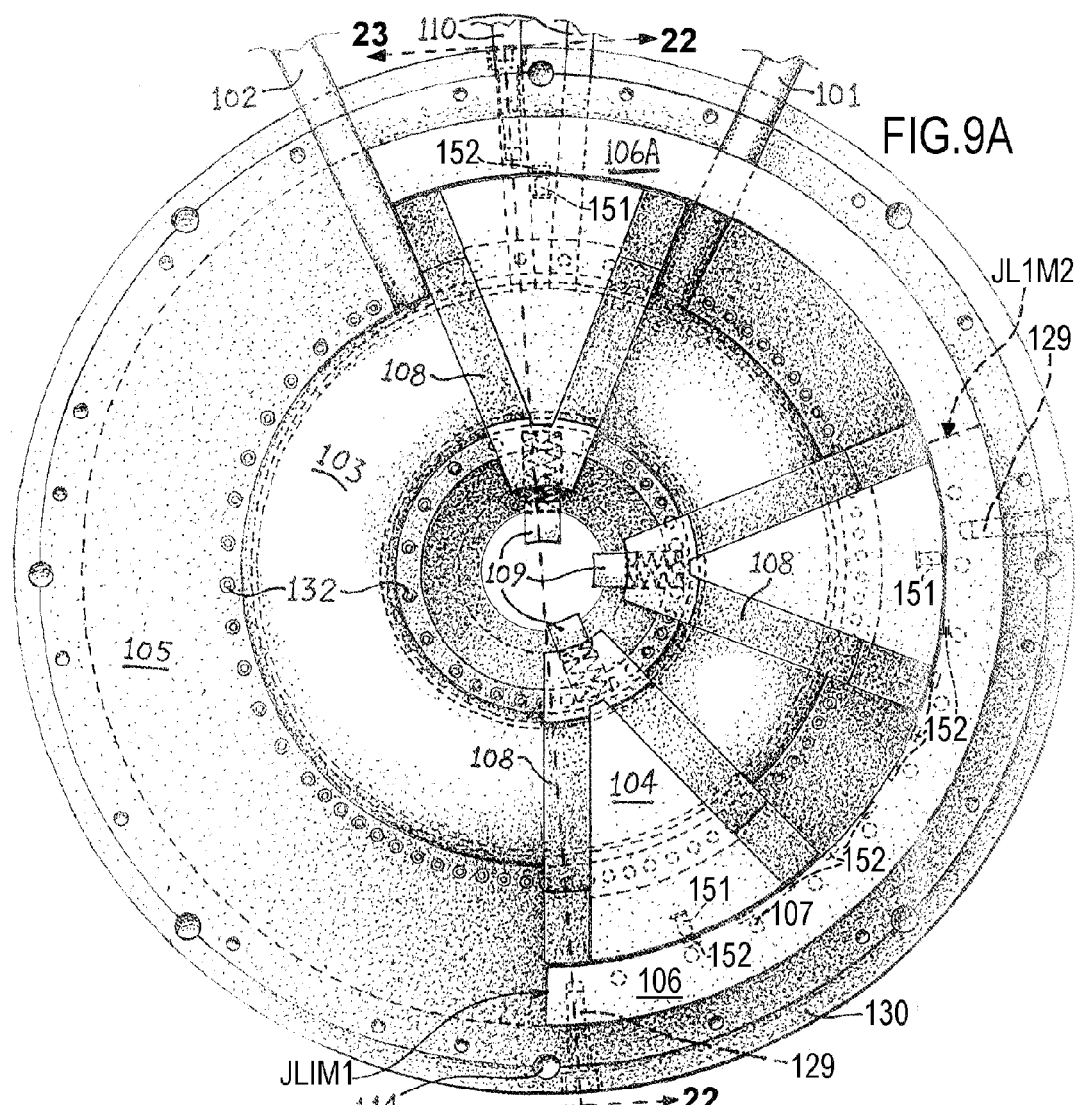
FIG. 9A is a plan view of the internal-combustion rotary engine of the present invention with three identical pistons. For showing more details, the top half of the horizontal section of the rotary engine is partially removed; only, the electromagnetic grips for the three pistons are shown in full, including the three carbon brushes. The electromagnetic double-disc flywheel is also fully removed from this view to facilitate the showing of the location of the carbon brushes on the electromagnetic grips.
Figure 11:
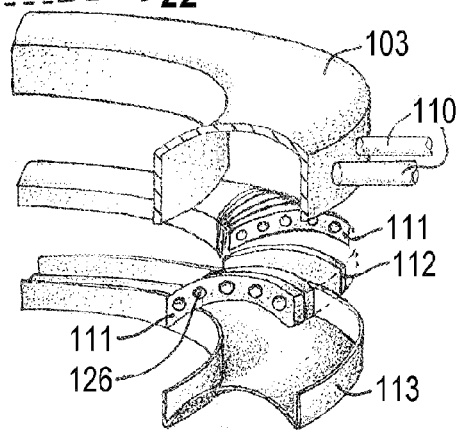
FIG. 11 is an enlarged diagrammatic exploded approximate view taken out of FIG. 10 of an axially oriented ferromagnetic liquid cooling jacket for the hollow toroidal cylinder of the internal-combustion rotary engine of the present invention.
Figure 9B:
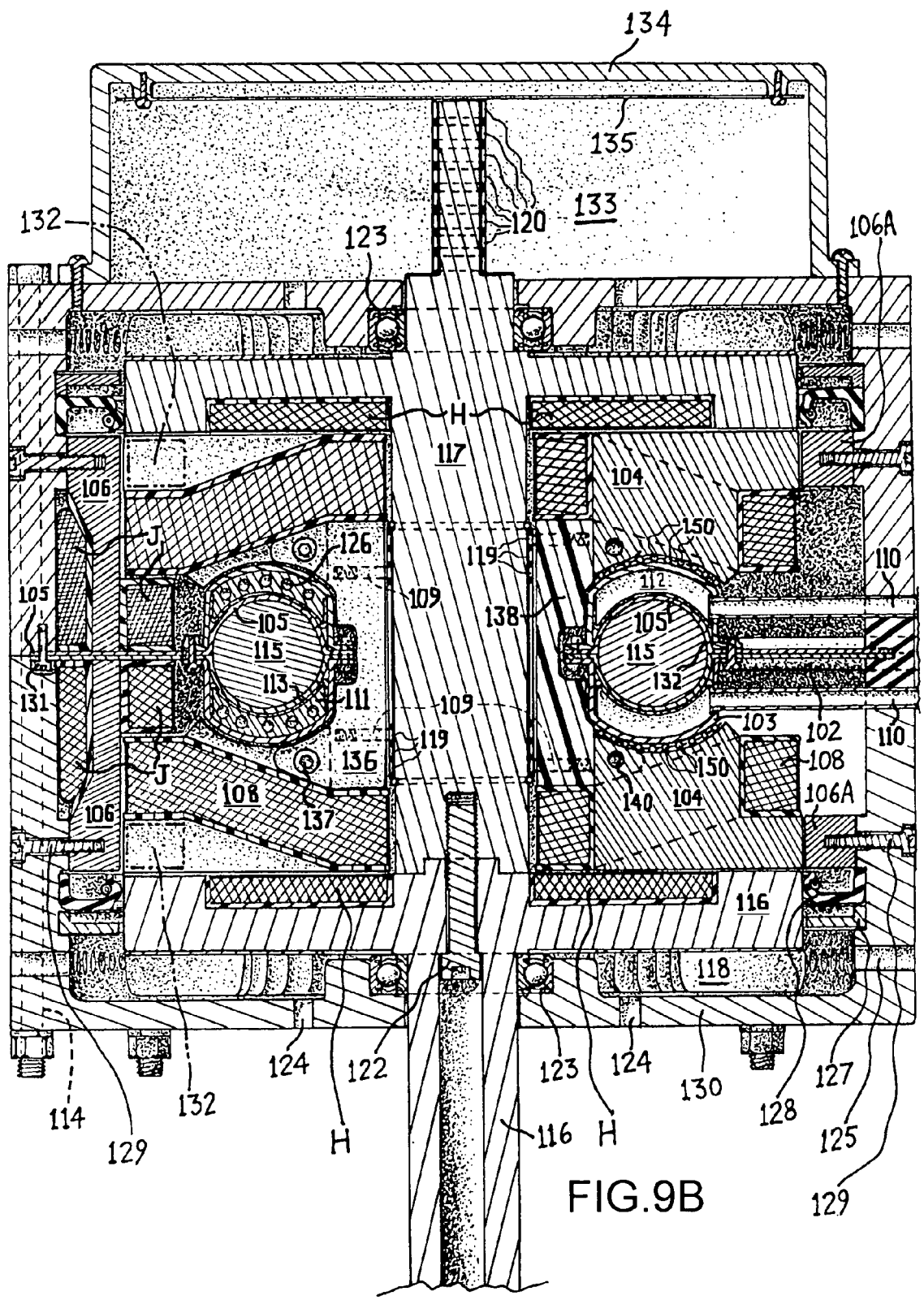
FIG. 9B is a cross-sectional view taken along line 22-22 in FIG. 9A with the details of the top half of the horizontal section shown, including 8 Nos. of slip rings inside a housing meant for electrical and electronic circuitry. The electromagnetic double-disc flywheel is also shown in full section.

The internal-combustion rotary engine of the present invention with three identical pistons (FIG. 9A) has three pairs of electromagnetic grips for the three pistons. This engine follows the combustion cycle explained with the help of FIG. 1A through FIG. 1F. Each electromagnetic grip 104 (FIG. 9A, FIG. 9B and FIG. 10) is primarily made of laminated electrical-grade silicon steel, or some equivalent or better material. Electromagnetic grip 104 has grip-activation winding 108 (FIG. 9A, FIG. 9B and FIG. 10), preferably wound with H-class enameled aluminum wire for reducing the weight of electromagnetic grip 104. The electromagnetic double-disc flywheel is fully removed from the view in FIG. 9A to conveniently show centrally facing carbon brushes 109 (FIG. 9A and FIG. 9B) on joining plate 138 made with a strong, preferably dielectric material. Joining plate 138 is fixed to a pair of electromagnetic grips 104 with the use of two low-loss link plates 136 and low-loss fasteners 137 by passing them through stamping holes 140 (FIG. 9B). Low-loss fasteners 137 may have to be semi-circularly curved, if stamping holes are made by holes punched into individual stampings. Carbon brushes 109 are assembled as four pairs, a pair each for the four windings. Out of these four windings, three are grip-activation windings which again are in pairs for each individual piston 115 (FIG. 9B and FIG. 10), and the fourth winding is double-disc electromagnetic flywheel winding H (FIG. 9B, FIG. 10 and FIG. 4) for electromagnetic double-disc flywheel composed of shaft-side disc 116 (FIG. 9B and FIG. 10) and slip-ring disc 117 (FIG. 9B) joined and put in position by locking fastener 122 (FIG. 9B). The electromagnetic double-disc flywheel is rotationally fixed to engine enclosure half 130 (2 Nos.) with the use of double-Z rolling bearing 123 on either end (FIG. 9A and FIG. 9B). Carbon brushes 109 rub against corresponding slip rings 119 (FIG. 9B) to draw energizing electric power supplied to receptor rings 120 near the other axial end of slip-ring disc 117, inside electronic control housing 134 (carbon brush holders not shown inside electronic control housing 134). Electronic control housing 134 has the necessary electrical and electronic components fitted on PCB 135; these components occupy control area 133 (FIG. 9B). The electrical and electronic controls are necessary for the functioning of this engine of the present invention, and their functional outcome has been described hereinbefore with the help of FIG. 4 and FIG. 5. Appropriate combustion sensing device (not shown) is fixed on hollow toroidal cylinder half 105 (FIG. 9A, FIG. 9B and FIG. 10). These two symmetrical cylinder halves 105 are joined together with the help of multiple screws 132 positioned radially on both the flat sides of the hollow toroidal cylinder (FIG. 9A and FIG. 9B). Locating screw 131 (FIG. 9B) is fastened through holes 131A (FIG. 9A) in on the outer flat side of the hollow toroidal cylinder, to locate the hollow toroidal cylinder on engine enclosure half 130 (FIG. 9A and FIG. 9B). Electromagnetic braking ring 106 and extension poles 106A are magnetized by electromagnetic braking ring winding J (FIG. 9B, FIG. 10 and FIG. 4) which angularly spans approximately limits JLIM1 to JLIM2 (FIG. 9A); upwards beyond JLIM2 in FIG. 9A, electromagnetic braking ring 106 extends angularly till port 102 in the form of extension poles 106A (FIG. 9A, FIG. 9B and FIG. 10). Electromagnetic braking ring 106 is assembled with two axial components joined by putting fasteners through holes 107 (FIG. 9A and FIG. 10). Holes 107 can be partially drilled as shown in FIG. 9A, or can be fully drilled as shown in FIG. 10. Permanent magnets can also be used in the place of electromagnetic braking ring 106 and the electromagnetic double-disc flywheel composed of shaft-side disc 116 (FIG. 9B and FIG. 10) and slip-ring disc 117 (FIG. 9B). The use of permanent magnets save some space in the engine, reduce the number of carbon brushes and slip rings, and also reduce the field current requirement for the functioning of the engine of the present invention being described here. But there would be two major disadvantages, (a) chipping of permanent magnets jamming the engine, and (b) no possibility of regular demagnetization for loosening the ferromagnetic particles attached to various magnetic elements of the engine. Braking-ring-securing fastener 129 is used in multiples to join electromagnetic braking ring 106 with engine enclosure half 130 (FIG. 9A and FIG. 9B). The two engine enclosure halves 130 are joined using long fasteners running through holes 114 (FIG. 9A and FIG. 9B). Air inlet 124 and air outlet 125 are openings in enclosure halves 130 (FIG. 9B). Centrifugal fans 118 rotate with the rotation of the double-disc flywheel, and cool the engine. A film of high viscosity silicon oil is maintained between the magnetically active surfaces of electromagnetic braking ring 106, the three pair of electromagnetic grips 104 and the electromagnetic double-disc flywheel (FIG. 9A, FIG. 9B and FIG. 10). This film prevents the jamming of the gaps between the magnetically active surfaces with foreign particles, and also aids conduction of heat from the hollow toroidal cylinder and the electromagnetic grips to the outside of the engine. The cooling of the hollow toroidal cylinder is by a pair of external liquid cooling jackets; these jackets also reinforce the hollow toroidal cylinder. These jackets are composed of toroidal cover housing 103 (FIG. 9A, FIG. 9B and FIG. 10) magnetic director laminates 111 (FIG. 9B and FIG. 10) with liquid passages 126 (FIG. 10), inlet-outlet separator plates 112, cooling liquid ports 110 (FIG. 9B), and toroidal bottom sealing plate 113 (all shown in FIG. 11). Magnetic director laminates 111 (FIG. 9B and FIG. 10) are pressed to acquire the thickness-gradient conforming to the inside and outside diameter of the hollow toroidal cylinder. Magnetic director laminates 111 are also coated on one or both sides with a high-temperature dielectric to reduce eddy-current losses and to reduce the circular magnetic permeability in the fully assembled external liquid cooling jackets. This feature lessens magnetic disturbances to adjoining pistons due to electromagnetic changes in each piston. The pair of external liquid cooling jackets are cemented to the respective hollow toroidal cylinder half 105. The increased strength of the hollow toroidal cylinder with the use of two external liquid cooling jackets, makes it possible to use high compression ratios for internal combustion. The constituent components cannot be made with good conductors of electricity, like copper or aluminum. Use can be made of stainless steel or other corrosion-resistant electrically less-conducting alloys. Sliding rolling bearings 150 (FIG. 9B) are used to reduce the friction between the semicircular-profiled toroidal surface of toroidal cover housing 103 and the matching inner surface of electromagnetic grip 104 (FIG. 9B). Reliable lubrication is important for the reliable functioning of this engine of the present invention. For the prevention of outside dirt getting into the moving parts of the engine use is made of two rubber sealing ring 128 and two protector rings (FIG. 9B). Collision between two pairs of electromagnetic grips 104 is unavoidable during the engine operation; use of hard-rubber impact pads (mounting location 132 shown FIG. 9B) can prevent damage to grip activation windings 108 (FIG. 9A, FIG. 9B and FIG. 10) due to such collisions. The pistons 115 (FIG. 9B and FIG. 10) are machine accurately on their faces also besides the mandatory profile machining; the piston faces are made with hard alloys with a small coefficient of linear expansion.

Light source means 151 (FIG. 9A) in the form of LEDs can be put on each pair of electromagnetic grips to signal the position of corresponding pair of electromagnetic grips 104 (FIG. 9A and FIG. 9B) to stationary opto-electronic sensor means 152 (FIG. 9A) fixed externally to light source means 151. These LEDs draw power from the corresponding carbon brushes 109 (FIG. 9A and FIG. 9B). In another variation of the design being discussed here, the total number of slip rings is reduced to six only (with reference to slip rings 119 and receptor rings 120 shown in FIG. 9B adding to fourteen in number). In this variation of the design, for controlling the direction of magnetization in a pair of electromagnetic grips 104, individual inverters are mounted right on electromagnetic grips 104 themselves. These miniature inverters are made with semiconductor power switches, sensors and amplifiers, and they move angularly with the movements of the corresponding pair of electromagnetic grips 104. The sensors used for making the inverters functional are preferably of opto-electronic type. These sensors receive optically encoded signals from external, mostly stationary, sources to operate the inverters to collectively produce proper magnetization of each pair of electromagnetic grips 104 (FIG. 9A and FIG. 9B), as explained earlier with the help of FIG. 4 and FIG. 5.

Proper lubrication and cooling of the internal surface of the hollow toroidal cylinder of various engines of the present invention is absolutely essential. A vertical orientation of an engine of the present invention, as depicted in all the drawings, is useful in preventing the outflow of lubricating oil through the exhaust port. The start of a compression cycle by a piston of an engine of the present invention produces initially suction when crossing the intake port; this suction pressure can be used to suck lubrication oil into the hollow cylindrical cylinder of an engine of the present invention. An outlet valve can be placed near the bottommost part of the cylinder to collect the return flow of the lubrication oil.

A modulated-intake internal-combustion engine with three or four pistons of the present invention is governed by the same principle as described in detail hereinbefore. Modulated intake is used to avoid repetitive combustions taking place in the same region of the hollow toroidal cylinder of an engine of the present invention. This simplifies the workings of an engine of the present invention somewhat. But more importantly, modulated intake spreads combustion stresses over a longer angular length of the hollow, toroidal cylinder of an engine of the present invention. This lessens thermally induced distortions in the hollow toroidal cylinder and reduces forced cooling requirement of an engine of the present invention. The process of modulated intake is best understood by reference to FIG. 1A through FIG. 1F. One is reminded of the process of combustion as explained in the beginning of this section, after the first combustion takes place in FIG. 1B, Piston C starts moving clockwise towards port E due to the pressure of the post-combustion hot gases (FIG. 1C); just around this instant, piston B also momentarily turns into a moving piston to reach a predetermined homing position as depicted in FIG. 1D. In the process of modulated intake, the step of making a momentary movement of piston B to reach the homing position is skipped. This makes each successive intake volume lesser by the volume displaced by one piston. But of more importance is the fact that the location of each, successive combustion is different, which prevents the post-combustion pile up of heat at one location of the hollow cylindrical cylinder. In this process, a stage comes when no intake is possible to produce any combustion, this stage is sensed by using a sensor; this situation coincides with one radial face of piston B stopping adjacent to port I in a scheme generally equivalent to the one shown in FIG. 1A. When this zero-intake stage is reached in the engine operation of the present invention, the engine cycle starts all over again, as described in the present description with reference to the description in the beginning with the help of FIG. 1A through FIG. 1C. It is to be noted that in FIG. 5, the positive pulse spanned by P22 and P11 will be absent from the oscillogram for the modulated-intake operation being explained here; additionally the timing of the second combustion C1F will be nearly 50° earlier in the oscillogram of FIG. 5, as the angular distance traveled by the compressing piston (piston B in FIG. 4) will be less. The explained operation of modulated-intake internal-combustion engine of the present invention holds for the four-piston operation of the engine of the present invention (FIG. 2A through FIG. 2F, FIG. 6 and FIG. 7). In a four-piston engine of the present invention, less amount of vibration due to a uniform distribution of moving piston at all the times, the modulated-intake operation described here does not produce any perceptible difference in engine vibrations. Even in a three-piston engine of the present invention, the modulated-intake operation does not add much to the engine vibrations, because a combustion takes place in every revolution of the electromagnetic double-disc flywheel; inherently making the engine operation low vibration, compared to conventional two- or four-stroke internal-combustion single-cylinder rotary engines.

A torus shape is a curved cylinder with the ends of the cylinder fused together. The present invention can be implemented in another embodiment with a straightened hollow cylinder to make a linear alternator linked with an internal-combustion engine, which only produces sufficient electricity to sustain its own subsequent combustion cycle and control operations; the remaining kinetic energy of the expanding gases after combustion inside such an internal-combustion engine is used to thrust the stopping piston having turned into a moving piston after combustion, as explained in detail in the preceding description. The moving piston is thrust out of one of the open ends, which acts as the exhaust port E (shown in a different embodiment in FIG. 1A through FIG. 1F) of the straightened hollow cylinder. As the two ends in this embodiment of the present invention are on opposing ends, there is no need for a blocking piston between I and E, as there was in the schematic of engine operation shown in FIG. 1A through FIG. 1F. The thrust on the moving piston after combustion can be used for accomplishing tasks needing high kinetic energy in an impacting body. This embodiment of the present invention is much simpler in operation compared to the toroidal embodiments of the present invention. This linear alternator linked with an internal-combustion engine only requires a train of identical pistons forming a functional pair, every time a combustion has to be triggered inside the straightened cylinder. The identical pistons are either disposable or are recycled, subsequent to their successive exit after thrust out of exhaust port E (shown in a different embodiment in FIG. 1A through FIG. 1F).

All the various embodiments of the internal-combustion engines of the present invention can easily be operated as externally ignited internal combustion engines. These kind of engines of the present invention have to have a greater computational devices to adjust to different fuels like gasoline, Compressed Natural Gas (CNG), Liquefied Petroleum Gas (LPG), diesel, bio-fuels, and hydrogen. The engine operation linked to the sensing of internal combustion has to be replaced by linking the engine operation to the externally initiated source of ignition, namely, an electrical spark or injection of combustible fuel in the compressed gaseous mixture needed for burning of combustible fuels. Externally spark-ignited internal combustion engines of the present invention can operate with much lesser pressure inside the hollow toroidal cylinder of the present invention; which makes them simpler to produce using the principles of the present invention, compared to making diesel-cycle engines of the present invention.

What is claimed is:

1. A relaying piston valve-less electromagnetically controlled internal combustion engine comprising:

a fully enclosed toroidal cylinder cavity with uniformly smooth bore, connected with only one inlet port and one outlet port to a gaseous medium;

three semi-toroidal pistons within said cylinder cavity;

said semi-toroidal pistons slidingly enclosing and moving along said gaseous medium within said cylinder cavity;

winding means on said cylinder cavity to selectively impart electromagnetic forces on each of said semi-toroidal pistons for electromagnetically selected and forced successive movement, braking and stationary-making of each of said semi-toroidal pistons;

at least two windings, placed in the angular distance between said inlet and outlet ports, to successively hold electromagnetically at least one of said semi-toroidal pistons at a time;

said gaseous medium enters from said inlet port into said cylinder cavity where said semi-toroidal pistons with said electromagnetically selected and forced successive movement of each of said semi-toroidal pistons, one at a time, slidingly effecting intake and compression of said gaseous medium to produce a combustion either by auto-ignition or by initiation from an outside source in the form of either an electrical discharge through said medium or an injection of hydrogen/hydrocarbons into said gaseous medium;

the volumetric expansion of said gaseous medium from the kinetic energy released during said combustion effecting the post-combustion angular mechanical movement of each of said semi-toroidal pistons with a sensor sensing said combustion and electromagnetically releasing each of said pistons from a stationary status, one at a time; each of said semi-toroidal pistons in said stationary status prior to said combustion having also immovably effected, one at a time, said compression of said gaseous medium, while each of said semi-toroidal pistons, one at a time, slidingly effecting said intake and compression of said gaseous medium to produce a combustion, going into said stationary status undergoing an electromagnetic status reversal with said sensor sensing said combustion;

said combustion taking place successively in a manner that the next said combustion takes place subsequent to said gaseous medium having volumetrically expanded fully inside said cylinder cavity after the first said combustion and reaching said outlet port; and following said combustion, after a short delay, the one of said pistons, slidingly having effected said intake and compression of said gaseous medium which produced said combustion, moving to occupy the space vacated by the one of said semi-toroidal pistons in said post-combustion angular mechanical movement; and each one of said semi-toroidal pistons successively moving after each said combustion, one by one, in the direction of said angular movement, to always keep blocked the shorter of the two angular distances between said radially located inlet and outlet ports inside said cylinder cavity.

2. A relaying piston multiuse valve-less electromagnetically controlled internal combustion engine in accordance with claim 1, wherein said inlet and outlet ports are interchangeable with external selectability, effecting said three semi-toroidal pistons to move in both angular directions.

3. A relaying piston multiuse valve-less electromagnetically controlled internal combustion engine in accordance with claim 1, wherein each successive intake of said gaseous medium into said cylinder cavity through said inlet port is modulated in volume for said combustion to successively take place at non-coincidental locations in said cylinder cavity.

4. A relaying piston multiuse valve-less electromagnetically controlled internal combustion engine in accordance with claim 1, wherein said cylinder cavity provides a larger volume for said volumetric expansion of said gaseous medium from the kinetic energy released during said combustion than the volume of said gaseous medium just prior to said compression of said gaseous medium; said larger volume allows a sufficient decrease in the kinetic energy of said gaseous medium volumetrically expanding from said kinetic energy released during said combustion, at the time of the escaping of said gaseous medium from said outlet port of said cylinder cavity.

5. A relaying piston multiuse valve-less electromagnetically controlled internal combustion engine in accordance with claim 1, wherein said cylinder cavity is inside a stator;

said three semi-toroidal pistons have permanent magnet rotor means of polarity axially oriented to said cylinder cavity;

said winding means are integrated with said stator, which either are in phase-wise continuity or are electronically switched selectively to produce either a stepped or a two- or three-phase alternating current under the successive magnetic influence of said angular mechanical movement;

magnetic-field sensor means is/are placed on said stator externally to said toroidal cylinder cavity to sense the position of said rotor means;

electrical, semiconductor-based switching means are connected to said winding means to select and control said winding means that selectively function as the stator of a brush-less dc motor with said three semi-toroidal pistons functioning as individual rotors;

diode means are connected to said winding means to rectify all alternating-current voltages higher than the series forward drop or drops of said diode means;

electric storage and/or supply means absorb the electric power from said alternating-current voltages after said diode means rectify said alternating-current voltages into direct-current voltages which pass then through an electronic power-conditioning circuit or circuits to reach said electric storage and/or supply means;

said electric storage and/or supply means electromagnetically power said engine to effect the first said compression of said gaseous medium leading to said combustion;

said electric storage and/or supply means absorb said alternating-current voltages, after said alternating-current voltages pass through said electronic power-conditioning circuit or circuits, to restart said internal combustion engine by electromagnetically powering said engine to effect the first said compression of said gaseous medium leading to said combustion.

6. A relaying piston multiuse valve-less electromagnetically controlled internal combustion engine in accordance with claim 1, wherein
said three semi-toroidal pistons are mainly made of a ferromagnetic material with functional medium-frequency eddy-current losses;
said cylinder cavity is inside a toroidal cylinder not made purely of copper or aluminum;
three electromagnetically activated and movable pairs of grips, slidingly fitted externally to said toroidal cylinder, correspondingly hold said three semi-toroidal pistons magnetically;
said at least two windings as braking means, especially electromagnetic braking means, is/are either circularly or semi-circularly placed adjacently external to imaginary circular lines drawn by the movements of said three electromagnetically activated, magnetically movable pairs of grips;
at least one magnetic or electromagnetically activated disc is rotatably fixed coaxially to said toroidal cylinder and is radially adjacent to said imaginary circular lines drawn by the movements of said three electromagnetically activated and movable pairs of grips;
at least two electrical wiping contacts or brushes are mechanically fixed to each said electromagnetically activated and movable pair of grips and are electrically routed to corresponding electrical winding or windings of each said electromagnetically activated, magnetically movable pair of grips, using either of the following connection means,
  (a) electrical conductors, or
  (b) an inverter means driven by external optical signals;
at least two slip rings are matchingly fitted central to each said electrical wiping contacts or brushes to separately supply electrical power to each said corresponding electrical winding or windings, if said connection means used are (a) said electrical conductors; and at least two slip rings are matchingly fitted central to each said electrical wiping contacts or brushes to commonly supply electrical power to all said corresponding electrical winding or windings, if said connection means used are (b) said inverter means driven by external optical signals;
at least one electrical power conditioning circuit controls and regulates said electrical power to all said corresponding electrical winding or windings;
at least one electrical power source supplies electric power to said electrical power conditioning circuit;
at least one power shaft varyingly rotates with said magnetic or electromagnetically activated disc which is rotatably fixed coaxially to said toroidal cylinder and which rotates under the successive magnetic influence of said angular mechanical movement of each of said three semi-toroidal pistons;
at least one motive force means applies a torque on said power shaft/shafts to effect the first said compression of said gaseous medium leading to the first said combustion that starts said internal combustion engine;
at least one alternator, linked to said magnetic or electromagnetically activated disc, functions as said electrical power source;
at least one electrical storage means functions as another said electrical power source supplying electric power to said electrical power conditioning circuit to start said internal combustion engine.

7. A relaying piston multiuse valve-less electromagnetically controlled internal combustion engine in accordance with claim 6, wherein light source means in the form of LEDs, mechanically fixed to each said electromagnetically activated and movable pair of grips, derives/derive power from said at least two electrical wiping contacts or brushes and signals/signal corresponding stationary opto-electronic sensor means external to each said electromagnetically activated and movable pair of grips to effect individual electronic control over each said electromagnetically activated and movable pair of grips.

8. A relaying piston multiuse valve-less electromagnetically controlled internal combustion engine in accordance with claim 7, wherein magnetically anisotropic jacket means, placed around said toroidal cylinder, comprise
a plurality of either annular or semi-annular stampings or shims made of ferromagnetic material and coated either on one side or on both sides with a dielectric;
said plurality of either annular or semi-annular stampings or shims made of ferromagnetic material, which are stacked, one along another and so on, on the flat sides of said plurality of either annular or semi-annular stampings or shims made of ferromagnetic material, to make an assembly or a permanent structure;
said plurality of either annular or semi-annular stampings or shims made of ferromagnetic material which have a thickness gradient to accommodate said toroidal cylinder of any outer profile on the outside of said toroidal cylinder, and
said assembly or said permanent structure cemented or clamped to the outside of said toroidal cylinder.

9. A magnetically anisotropic jacket means placed around said toroidal cylinder in accordance with claim 8, wherein holes of any profile in every or some said plurality of either annular or semi-annular stampings or shims, form channels for the flow of heat-carrying liquids to run along the outside of said toroidal cylinder.

10. A relaying piston multiuse valve-less electromagnetically controlled internal combustion engine comprising:
a toroidal cylinder cavity with radially located only one inlet port and only one outlet port;
identical semi-toroidal first piston, second piston and third piston;
preferred collective stop position for said pistons being the region of least angular distance between said inlet and outlet port inside said toroidal cavity; said first piston blocking said outlet port, said third piston blocking said inlet port, said second piston angularly in between said first piston and said third piston in said least angular distance; said preferred position preventing the entry of outside gases and contaminants from entering said toroidal cylinder;
said third piston electromagnetically moving in a direction away from said collective stop position, effecting intake of combustible gas or gases through said inlet port, and undergoing temporary stopping at a position determined by combustion cycle and engine efficiency; after said temporary stopping of said third piston, said second piston moving in said direction, compressing said intake in a compression cycle;

spontaneous or triggered combustion of said intake taking place after sufficient or required compression;
a sensor means sensing said combustion, reversing the statuses of said third piston and said second piston electromagnetically by means outside said toroidal cylinder;
said third piston having released from said temporary stopping and moving further in said direction, while said second piston undergoing said temporary stopping;
said third piston moving further in said direction, pressed by the hot gases of said combustion, transferring power to external electromagnetically coupled elements in a power-releasing movement;
with said third piston nearing outlet port, said second piston moving in said direction for a brief while, halting at the position having vacated by said third piston after said combustion;
with said third piston moving in said direction and crossing said outlet port, said first piston electromagnetically getting released and moving in said direction, effecting another said intake, with said second piston at said halting, starting another said compression cycle leading to second said combustion;
the burnt gases from said combustion undergoing complete scavenging through said outlet port after said second combustion with second said power-releasing movement.

11. A relaying piston multiuse valve-less electromagnetically controlled internal combustion engine comprising:
a fully sealed toroidal cylinder cavity with only one epicentric inlet port and only one epicentric outlet port;
identical semi-toroidal first piston, second piston and third piston, in counterclockwise count;
a combustion sensor means;
preferred collective stop position for said pistons being the region of least angular distance between said inlet and outlet ports, inside said toroidal cavity; and
operating in steps of
  (a) said first piston moving clockwise from said preferred collective stop position, past said inlet port, effecting intake of combustible gas or gases through said port;
  (b) said first piston undergoing temporary stopping at a combustion position determined by combustion cycle and engine efficiency;
  (c) said second piston also moving in said direction, effecting compression of said intake;
  (d) spontaneous or triggered combustion of said intake taking place after sufficient or required said compression;
  (e) said combustion sensor means, electromagnetically reversing the statuses of said first piston and said second piston;
  (f) said first piston releasing from said temporary stopping, vacating said combustion position and moving further in said direction, pressed by the hot gases of said combustion, transferring power to external electromagnetically coupled elements in a power-releasing movement, said releasing from said temporary stopping simultaneous with said second piston undergoing a momentary halt;
  (g) said first piston in said power-releasing movement, nearing outlet port, with said second piston moving in said direction, braking at said combustion position which is vacated by said first piston after said combustion in the preceding step; the burnt gases from said combustion depressurizing through said outlet port after;
  (h) said first piston moving in said direction and crossing said outlet port with said third piston electromagnetically releasing and moving in said direction; said third piston effecting another said intake, with said second piston at said combustion position, starting another said compression, leading to second said combustion.

12. A relaying piston multiuse valve-less electromagnetically controlled internal combustion engine comprising:
a fully sealed toroidal cylinder cavity with only one epicentric inlet port and only one epicentric outlet port;
identical semi-toroidal first piston, second piston and third piston, in clockwise count;
a combustion sensor means;
preferred collective stop position for said pistons being the region of least angular distance between said inlet and outlet ports, inside said toroidal cavity; and
operating in steps of
  (a) said first piston moving counterclockwise from said preferred collective stop position, past said inlet port, effecting intake of combustible gas or gases through said port;
  (b) said first piston undergoing temporary stopping at a combustion position determined by combustion cycle and engine efficiency;
  (c) said second piston also moving in said direction, effecting compression of said intake;
  (d) spontaneous or triggered combustion of said intake taking place after sufficient or required said compression;
  (e) said combustion sensor means, electromagnetically reversing the statuses of said first piston and said second piston;
  (f) said first piston releasing from said temporary stopping, vacating said combustion position and moving further in said direction, pressed by the hot gases of said combustion, transferring power to external electromagnetically coupled elements in a power-releasing movement, said releasing from said temporary stopping simultaneous with said second piston undergoing a momentary halt;
  (g) said first piston in said power-releasing movement, nearing outlet port, with said second piston moving in said direction, braking at said combustion position which is vacated by said first piston after said combustion in the preceding step; the burnt gases from said combustion depressurizing through said outlet port after; and
  (h) said first piston moving in said direction and crossing said outlet port with said third piston electromagnetically releasing and moving in said direction; said third piston effecting another said intake, with said second piston at said combustion position, starting another said compression, leading to second said combustion.

* * * * *